US 8,860,940 B2

(12) United States Patent
Bell et al.

(10) Patent No.: US 8,860,940 B2
(45) Date of Patent: Oct. 14, 2014

(54) METHOD AND SYSTEM FOR ALIGNING COLOR FILTER ARRAY

(75) Inventors: Cynthia Bell, Chandler, AZ (US); John Stowell, Tempe, AZ (US); Donald E. Adams, Gilbert, AZ (US)

(73) Assignee: Arizona Board of Regents, a body corporate of the State of Arizona, Acting for and on behalf of Arizona State University, Scottsdale, AZ (US)

( * ) Notice: Subject to any disclaimer, the term of this patent is extended or adjusted under 35 U.S.C. 154(b) by 99 days.

(21) Appl. No.: 13/396,074

(22) Filed: Feb. 14, 2012

(65) Prior Publication Data

US 2013/0044319 A1   Feb. 21, 2013

Related U.S. Application Data

(63) Continuation of application No. PCT/US2010/045397, filed on Aug. 12, 2010.

(60) Provisional application No. 61/234,210, filed on Aug. 14, 2009, provisional application No. 61/285,843, filed on Dec. 11, 2009, provisional application No. 61/321,674, filed on Apr. 7, 2010.

(51) Int. Cl.

| | | |
|---|---|---|
| *G01B 11/00* | (2006.01) | |
| *G02B 5/30* | (2006.01) | |
| *G02B 27/28* | (2006.01) | |
| *G02B 5/22* | (2006.01) | |
| *G06K 9/00* | (2006.01) | |
| *G02F 1/1335* | (2006.01) | |
| *H01J 9/46* | (2006.01) | |
| *H05B 33/10* | (2006.01) | |
| *B23Q 1/28* | (2006.01) | |
| *B23Q 3/00* | (2006.01) | |
| *B25B 1/00* | (2006.01) | |
| *B25B 1/20* | (2006.01) | |
| *A47B 57/00* | (2006.01) | |
| *A47B 91/00* | (2006.01) | |
| *A47G 29/00* | (2006.01) | |
| *B65D 19/00* | (2006.01) | |
| *G02F 1/1333* | (2006.01) | |
| *G02B 5/20* | (2006.01) | |
| *G02B 27/62* | (2006.01) | |

(52) U.S. Cl.
CPC .......... *G02B 5/201* (2013.01); *G02F 1/133514* (2013.01); *G02B 27/62* (2013.01); *G02F 1/1333* (2013.01)
USPC ...... 356/399; 382/141; 359/491.01; 359/891; 349/106; 445/66; 269/20; 269/37; 269/55; 248/346.06; 108/59

(58) Field of Classification Search
None
See application file for complete search history.

(56) References Cited

U.S. PATENT DOCUMENTS 5,592,288 A * 1/1997 Sampica et al. ................. 356/62
5,660,574 A * 8/1997 Goda .............................. 445/66

(Continued)

FOREIGN PATENT DOCUMENTS

JP  2004-120797 A  4/2004
KR  10-2000-0069192 A  11/2000

(Continued)

OTHER PUBLICATIONS

ISR and Written Opinion for corresponding Int'l Application No. PCT/US2010/045392 dated Apr. 1, 2011.

(Continued)

*Primary Examiner* — Gordon J Stock, Jr.
(74) *Attorney, Agent, or Firm* — Bryan Cave LLP

(57) ABSTRACT

A method and system of aligning color filter array are disclosed. Other embodiments are disclosed herein.

12 Claims, 21 Drawing Sheets

(56) References Cited

U.S. PATENT DOCUMENTS

| | | | |
|---|---|---|---|
| 6,005,653 A * | 12/1999 | Matsuzawa | 349/154 |
| 6,047,875 A * | 4/2000 | Al-Nabulsi | 228/5.5 |
| 6,104,466 A * | 8/2000 | Buchwalter et al. | 349/187 |
| 6,129,804 A * | 10/2000 | Gaynes et al. | 156/297 |
| 6,193,576 B1 * | 2/2001 | Gaynes et al. | 445/24 |
| 6,458,005 B1 * | 10/2002 | Baker et al. | 445/24 |
| 6,694,608 B2 * | 2/2004 | Ogimoto | 29/832 |
| 6,798,473 B2 | 9/2004 | Kaneda et al. | |
| 6,977,683 B1 | 12/2005 | Okada | |
| 7,027,091 B1 | 4/2006 | Reyneri et al. | |
| 7,259,788 B1 | 8/2007 | Olding et al. | |
| 7,414,603 B2 * | 8/2008 | Tseng | 345/87 |
| 7,768,683 B2 | 8/2010 | Bates et al. | |
| 7,814,676 B2 * | 10/2010 | Sampica et al. | 33/645 |
| 7,859,274 B2 | 12/2010 | Kim et al. | |
| 8,419,496 B1 * | 4/2013 | Smith et al. | 445/25 |
| 8,441,562 B1 * | 5/2013 | Szedo et al. | 348/280 |
| 2004/0145698 A1 * | 7/2004 | Yokoue | 349/190 |
| 2006/0158511 A1 * | 7/2006 | Harrold et al. | 348/51 |
| 2008/0074598 A1 | 3/2008 | Ham et al. | |
| 2008/0231982 A1 | 9/2008 | Sumi | |
| 2011/0067805 A1 * | 3/2011 | Hwang et al. | 156/230 |
| 2012/0147468 A1 * | 6/2012 | Bell et al. | 359/491.01 |
| 2013/0023075 A1 * | 1/2013 | Lee et al. | 438/29 |

FOREIGN PATENT DOCUMENTS

| | | |
|---|---|---|
| KR | 10-2004-0042652 A | 5/2004 |
| WO | 2005-085942 A1 | 9/2005 |

OTHER PUBLICATIONS

ISR and Written Opinion for corresponding Int'l Application No. PCT/US2010/045397 dated Jun. 21, 2011.

* cited by examiner

| 21 | 22 | 21 | 22 | 21 | 22 | 21 | 22 | 21 |
|----|----|----|----|----|----|----|----|----|
| 23 | 21 | 23 | 21 | 23 | 21 | 23 | 21 | 23 |
| 21 | 22 | 21 | 22 | 21 | 22 | 21 | 22 | 21 |
| 23 | 21 | 23 | 21 | 23 | 21 | 23 | 21 | 23 |
| 21 | 22 | 21 | 22 | 21 | 22 | 21 | 22 | 21 |
| 23 | 21 | 23 | 21 | 23 | 21 | 23 | 21 | 23 |
| 21 | 22 | 21 | 22 | 21 | 22 | 21 | 22 | 21 |
| 23 | 21 | 23 | 21 | 23 | 21 | 23 | 21 | 23 |
| 21 | 22 | 21 | 22 | 21 | 22 | 21 | 22 | 21 |

METHOD AND SYSTEM FOR ALIGNING COLOR FILTER ARRAY

CROSS-REFERENCE TO RELATED APPLICATIONS

This application is a continuation of International Patent Application Serial No. PCT/US2010/045397, filed Aug. 12, 2010. International Patent Application Serial No. PCT/US2010/045397 claims priority to (a) U.S. Provisional Patent Application Ser. No. 61/234,210, filed Aug. 14, 2009; (b) U.S. Provisional Patent Application Ser. No. 61/285,843, filed Dec. 11, 2009; and (c) U.S. Provisional Application Ser. No. 61/321,674, filed Apr. 7, 2010. International Patent Application Serial No. PCT/US2010/045397, U.S. Provisional Patent Application Ser. No. 61/234,210, U.S. Provisional Patent Application Ser. No. 61/285,843, and U.S. Provisional Application Ser. No. 61/321,674 are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license to others on reasonable terms as provided by the terms of Grant/Contract No. W911NF-04-2-005 by the Army Research Lab (ARL).

FIELD OF THE INVENTION

The present invention relates generally to methods for aligning color filters. More particularly, the present invention relates to methods for aligning one or more color filter arrays over opaque monochromatic displays.

BACKGROUND OF THE INVENTION

Color filter arrays filter impinging light to transmit some visible wavelengths and retard other visible wavelengths in a pixilated pattern. Color filter arrays are used to form color displays in combinations with monochrome or grayscale displays. A monochrome light valve technology requires a color filter to be positioned over each monochrome light valve element or picture element, e.g., a pixel. Then each pixel is driven with data appropriate for the color filter residing over it. Full color images to be displayed having a red, green, and blue value for each pixel undergo image processing to retain a smaller color range for each pixel. For example, at a green backplane pixel location, red and blue data could be discarded.

If the alignment between the color filters and the light valves is poor, crosstalk between the image color channels occurs. Consequently, the display colors would appear abnormal, and the color gamut would shrink in proportion to the degree of color crosstalk.

Aligning color filters to opaque displays is challenging. An assembly process relying on electronic backplane visibility is unsuitable due to the opacity of the light valve material.

BRIEF DESCRIPTION OF THE DRAWINGS

To facilitate further description of the embodiments, the following drawings are provided in which:

FIG. 2 is an example illustrating a Bayer pattern;

Figure 1:
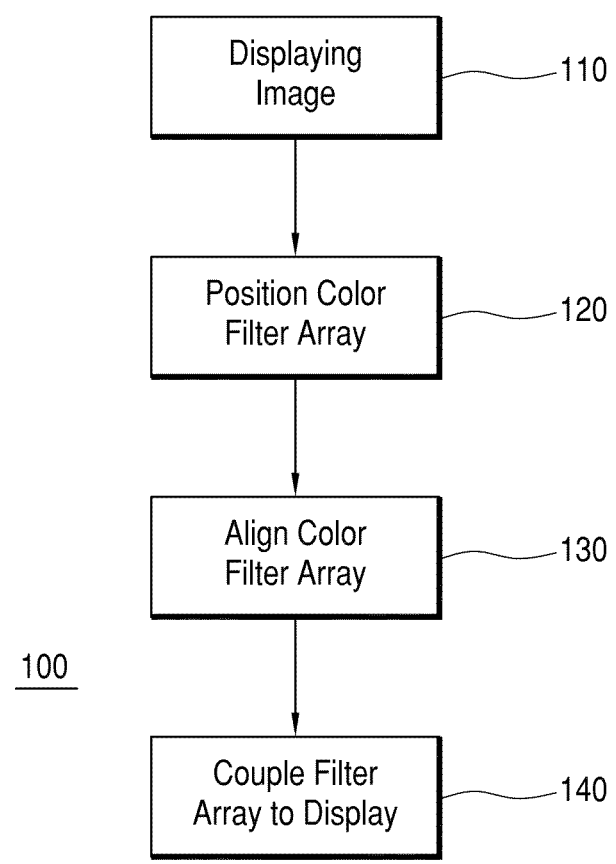
FIG. 1 is a flow chart illustrating an example of a method of aligning a color filter array over a display, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

An electrical "coupling" and the like should be broadly understood and include coupling involving any electrical signal, whether a power signal, a data signal, and/or other types or combinations of electrical signals. A mechanical "coupling" and the like should be broadly understood and include mechanical coupling of all types. The absence of the word "removably," "removable," and the like near the word "coupled," and the like does not mean that the coupling, etc. in question is or is not removable.

The absence of the word "removably," "removable," and the like near the word "coupled," and the like does not mean that the coupling, etc. in question is or is not removable. For example, the recitation of a display being coupled to a baseplate does not mean that the display cannot be removed (readily or otherwise) from, or that it is permanently connected to, the baseplate.

DETAILED DESCRIPTION

In a number of embodiments, a method of aligning a color filter array can include: displaying an image comprising tones at a display, where the tones are modulated to highlight a selected color in a color filter array; and positioning the color filter array and the display such that the color filter array is located over the display. As an example, positioning the color filter array and the display can include moving only the color filter array, moving only the display, or moving both the color filter array and the display. The method also can include aligning the color filter array and the display so that the selected color is dominant when evaluating the image through the color filter. As an example, aligning the color filter array and the display can include moving only the color filter array, moving only the display, or moving both the color filter array and the display.

In other embodiments, a method of aligning a color filter array can include: providing a color filter array having colors, where the colors comprise a first color of the colors; providing a pattern of tones, where the first color is represented by bright tones; displaying the pattern at a display; and aligning a color filter array over the display so that the first color appears when the bright tones reflect through the color filter array.

In yet other embodiments, a system for aligning a color filter can include: a baseplate configured to be coupled to a display; a support configured to be coupled to a color filter array; and an optical detector used to detect proper alignment between the display and the color filter array.

In further embodiments, a system for aligning a color filter array can include: a chuck configured to be coupled to a display; a holder configured to be coupled to a color filter array; and an adjustment assembly configured to adjust the position of the chuck relative to the holder.

In still further embodiments, a system for aligning objects can include: a base; a first holding mechanism configured to hold a first object of the objects; a second holding mechanism configured to hold a second object of the objects; and an adjustment mechanism coupled to the base and the first holding mechanism. The adjustment mechanism is configured to adjust the position of the first holding mechanism relative to the second holding mechanism.

In still other embodiments, a method of applying a flexible laminate to a display can include positioning the flexible laminate over an active area of the display, and applying pressure to the flexible laminate so that the laminate comes into contact with the display surface. In these embodiments, the flexible laminate can include a moisture barrier film and/or a color filter array.

Two aspects to proper color filter alignment include color pattern matching and spatial position precision.

To function properly, a display color filter's spectral pass band should be matched to the data path assigned to the backplane pixel beneath it. If the data path electronics are delivering green image data to a certain backplane pixel, the filter transmittance over that pixel should be high for green wavelengths and low for non-green wavelengths, thus giving a green color filter. Together, the green color filter and the underlying display monochrome pixel driven with data representing the desired tone of green will create a functional green display pixel. Whenever the color filter hue is mismatched to the display data stream, display pixels will have a hue other than the hue that is supposed to be displayed.

Figure 10:
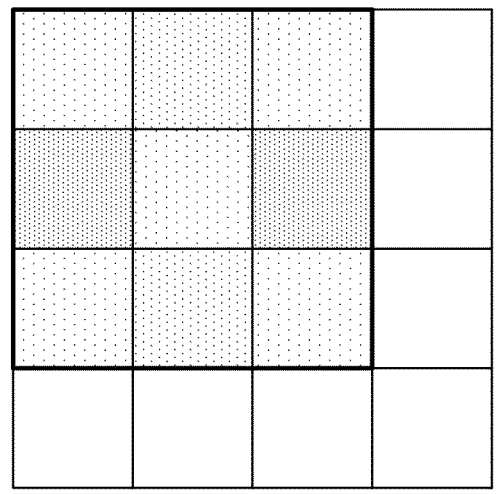
FIG. 10 is an illustration of an example of ideally aligned color filter pixels over display backplane pixels.
Figure 11:
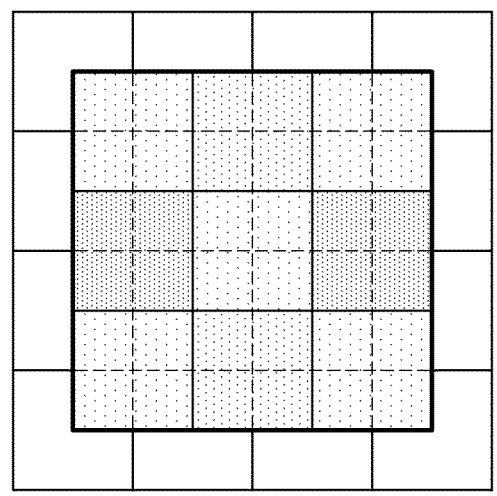
FIG. 11 is an illustration of an example of poorly aligned color filter pixels over display backplane pixels.

To function properly, a display's color filter must also be spatially aligned to the backplane pixel. The optically active portion of the backplane pixel should be filtered by only one color filter pixel. FIG. 10 illustrates an example in which color filter array pixels are properly aligned over backplane pixels. The backplane pixel lies beneath a color filter pixel in perfect spatial registration. FIG. 11 illustrates an example in which there is misregistration between color filter pixels and backplane pixels. Misalignment introduces additional filter hues to be combined and modulated with the same image data. For example, a color filter array misaligned by a fraction of a pixel could have green backplane pixels viewed partly through a green filter and partly a red filter, thus appearing yellow in hue.

If the color filter array is fractionally misaligned in both vertical and horizontal directions, portions of all adjacent color filter pixels will lie over each backplane pixel. The resulting color appearance would be a blend of all filter colors. Such a misaligned display would be unable to render saturated primary color hues. The number of colors a display can form would be reduced, representing a loss of color gamut.

The color filter array is typically designed to the specifications of the monochrome display. For example, each color filter array pixel will match the size and pitch of the backplane display pixels. In addition, the overall dimensions of the color filter array are determined by the size of the display. Furthermore, the color filter array is comprised of the color set or hues that are being delivered by the display's image processing path. For example, the color filter array can include red, green, and blue (RGB) hues. Additionally, color filters can further comprise neutral (sometimes called white), yellow, cyan and/or magenta hues.

In addition, the color filter array pattern must match the backplane data path color pattern. A common pattern is a 2×2 color matrix that is repeated across the display. As an example, the well-known Bayer color filter pattern comprises a first row of a green pixel then a red pixel. The second row of the matrix is a blue pixel then a second green pixel. When repeated across a display, the Bayer pattern appears as a row of alternating green pixels and red pixels followed by a second row of alternating blue pixels and green pixels located below the first row. These alternating patterns keep repeating down the display. An example of an illustration of a Bayer pattern is displayed in FIG. 2. In the example of FIG. 2, the regions of the Bayer pattern that are green are indicated by number 21; the regions of the Bayer pattern that are red are indicated by number 22; and the regions of the Bayer pattern that are blue are indicated by number 23. Modified Bayer patterns can be comprised of alternating red and green pixel rows with blue and white or blue and yellow pixel rows. The color filter array can also include patterns other than the Bayer pattern, such as, for example, alternating columns/rows of red, green, and blue stripes.

Turning to the drawings, FIG. 1 illustrates an example of a method of aligning a color filter array, according to a first embodiment. In the same or different embodiments, method 100 can be considered a method of aligning a color filter array with a display with backplane pixels which are not readily visible. Method 100 can also be considered a method of coupling a color filter array to a monochromatic display. Method 100 is merely exemplary and is not limited to the embodiments presented herein. Method 100 can be employed in many different embodiments or examples not specifically depicted or described herein.

In some embodiments, method 100 can comprise a procedure 110 of displaying an image on a display. The display can be any display in which a color filter array is to be coupled to the display. In some embodiments, the display is a monochromatic display. In other embodiments, the display is a chromatic display for which the color gamut is to be improved by additionally filtering the inherent primary colors. In the same or other embodiments, the display can be a flexible display. As an example, the display can be an electrophoretic display, an organic light-emitting diode (OLED) display, an electrochromic display, or a liquid crystal display (LCD). In some embodiments, the pixels of the display cannot be seen if the display is not activated. In addition, the display of method 100 can be a display that is electrically functional. In other words, the display is capable of displaying an image.

The image of procedure 110 can be an image that will help achieve the proper alignment of a color filter array when the color filter array is to be coupled to the display. The image of procedure 110 is dependent on the pattern of color filter array being used.

In many embodiments, the image of procedure 110 can be designed to use the characteristics of the color filter array to assist in aligning the color filter array with the display. As an example, the image can be designed to display bright tones at every backplane pixel, every other pixel, every third pixel, or another pattern corresponding to a particular color of the color filter array. In addition, dark tones can be displayed by the backplane pixels corresponding to the other colors in the color filter array. Bright tones will allow light to pass through the color filter array, and the display will reflect the color of the region of the filter through which the light passes. On the other hand, dark tones can absorb light that passes through the color filter array. Therefore, the display can appear dark in the areas of the display in which dark tones are displayed.

As an example, if the color filter array is arranged in the Bayer pattern, the image can consist of bright tones for each of the backplane pixels that correspond to the red regions of the color filter. The remaining backplane pixels can display dark tones. In another example, the image can consist of bright tones at each of the backplane pixels that correspond to the blue regions of the color filter array, and the remaining backplane pixels will display dark tones. In some embodiments, where the Bayer pattern is used, the image can consist of bright tones for all the red pixels or for all of the blue pixels, but the image cannot comprise bright tones for all of the green pixels as there are two green positions in the color filter sub-pattern. Thus, there is no assurance that the color filter array will be properly aligned over the display. This restriction is because of the arrangement of the green regions in the Bayer pattern of FIG. 2. It is possible to align the color filter array of FIG. 2 over the display so that all the pixels appear to be green. However, the remaining pixels can be misaligned. For example, the red regions of the color filter array can be over the blue pixels, and the blue regions of the color filter array can be over the red pixels. On the other hand, there is no possibility of misalignment if red or blue is used as the selected color for the design image.

Figure 20:
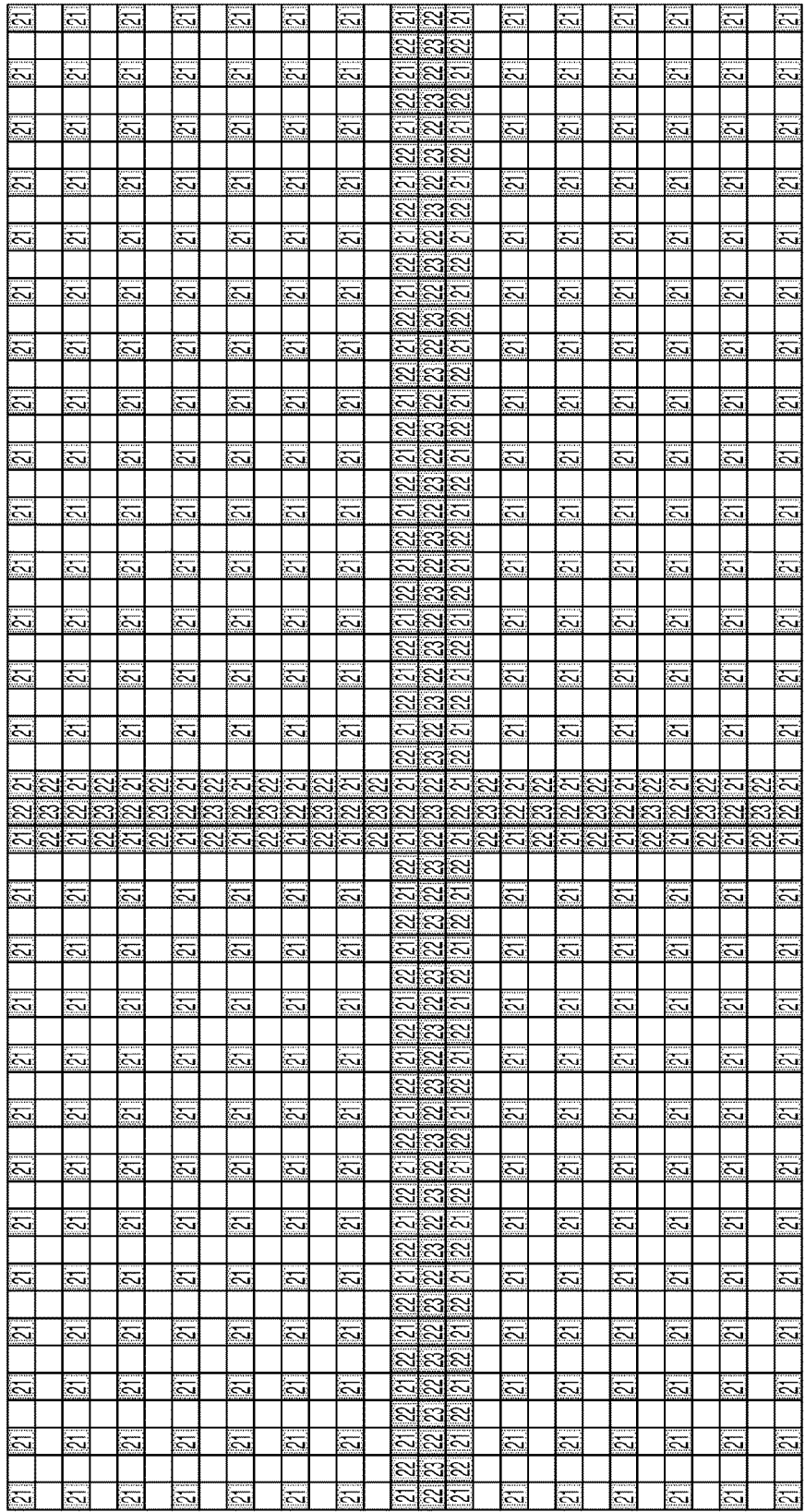
FIG. 20 illustrates a color filter array arranged in a Bayer pattern and aligned over a display, where the display has bright tones for each of the backplane pixels that correspond to the red or first regions of the color filter and for a cross pattern having three rows and three columns of bright tones intersecting at the center of the display and has dark tones for the remaining backplane pixels.

As illustrated in FIG. 20, in further examples, when the color filter array is arranged in the Bayer pattern, the image also can comprise at least bright tones for each of the backplane pixels that correspond to the red or first regions or blue regions of the color filter and a cross pattern comprising three rows and three columns of bright tones intersecting at the center of the display. In some embodiments, the cross pattern can comprise four, five, or more rows and four, five, or more columns. In many embodiments, the cross pattern can have an equal number of rows and columns. In other embodiments, the cross pattern can have an unequal number of rows and columns In some embodiments, this cross pattern can help to align the color filter in a different procedure of method 100 as described below. In other embodiments, where a design other than the Bayer pattern of FIG. 2 is chosen, it can be possible to have the image display comprise any single color present in the color filter spatial pattern.

After the image is designed, the image is transferred to the display drive electronics and is subsequently displayed on the display. In some examples, such as when an electrophoretic display is used, the power of the display may be removed after the image is displayed on the display. This option is available because electrophoretic displays retain static images, and therefore the image will remain after the power is removed. In other examples, such as an OLED display, the display will need to remain powered on during the color filter alignment process.

In some embodiments, the display can be operated in a static mode. In the same or different embodiments, the positive supply voltage ($V_{dd}$) to the display can be greater than or equal to approximately 6 volts (V) and less than or equal to approximately 8 V. In the same or different embodiments, the cathode voltage ($V_{cathode}$) to the display can be approximately 0.7 V. In some embodiments, the display can be operated in a static mode. In some embodiments, the $V_{dd}$ to the display can be approximately 8 V and the $V_{cathode}$ to the display can be approximately 0 V. In the same or different embodiments, the display can comprise a green phosphorescent organic light emitting diode (PHOLED). In some embodiments, the $V_{dd}$ to the display can be approximately 18 V and the $V_{cathode}$ to the display can be approximately −4 V. In the same or different embodiments, the display can comprise a white PHOLED.

Next, method 100 of FIG. 1 can continue with a procedure 120 of positioning the color filter array over the display. Positioning the color filter array over the display can include moving the color filter array and/or the display.

Color filter arrays for display applications can be made from a clear material that can receive a printed wave-length selective pattern. In one embodiment, the color filter array comprises a clear material having low absorption in the visible wavelengths, supporting high resolution printing, and low physical distortion when handled. For example, the color filter array can comprise a visibly transparent plastic substrate coated with an ink or toner receiving layer and printed color inks or toners in the desired color filter pattern. Commercially available transparent substrates intended for mailing labels may be suitable. Commercial sources for the transparent substrates include Avery Dennison Corporation of Pasadena, Calif. and OfficeMax, Inc. of Naperville, Ill., among others. In another example, the color filter can comprise dichroic color filters formed according to deposition and patterning methods on an otherwise visibly transparent substrate, such as, or example, glass. Commercial sources for dichroic filters include Ocean Optics of Dunedin, Fla. and OCLI Inc. of Santa Rosa, Calif. In yet another example, the color filter can comprise a visibly transparent substrate formed with pixel-scale recesses filled with inks or pigments to filter light according to the color filter pattern. Any of these color filter forming methods as well as others may be used to prepare color filter arrays suitable for use with this alignment method.

Figure 13:
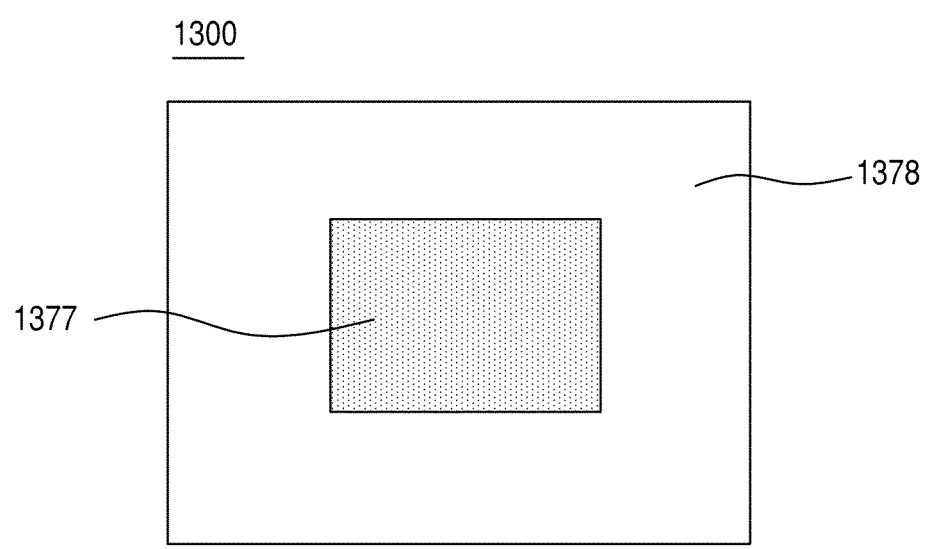
FIG. 13 is an example of a color filter array, according to a first embodiment.

In many embodiments, the color filter array can be coupled to a support. FIG. 13 illustrates an example of a color filter array 1300 before it is coupled to the support, according to a first embodiment. Color filter array 1300 comprises transparent areas 1378, which is a border area of color filter array 1300. In addition, color filter array 1300 comprises spectrally selective area 1377, which comprises the pattern of color filter array pixels.

Figure 3:
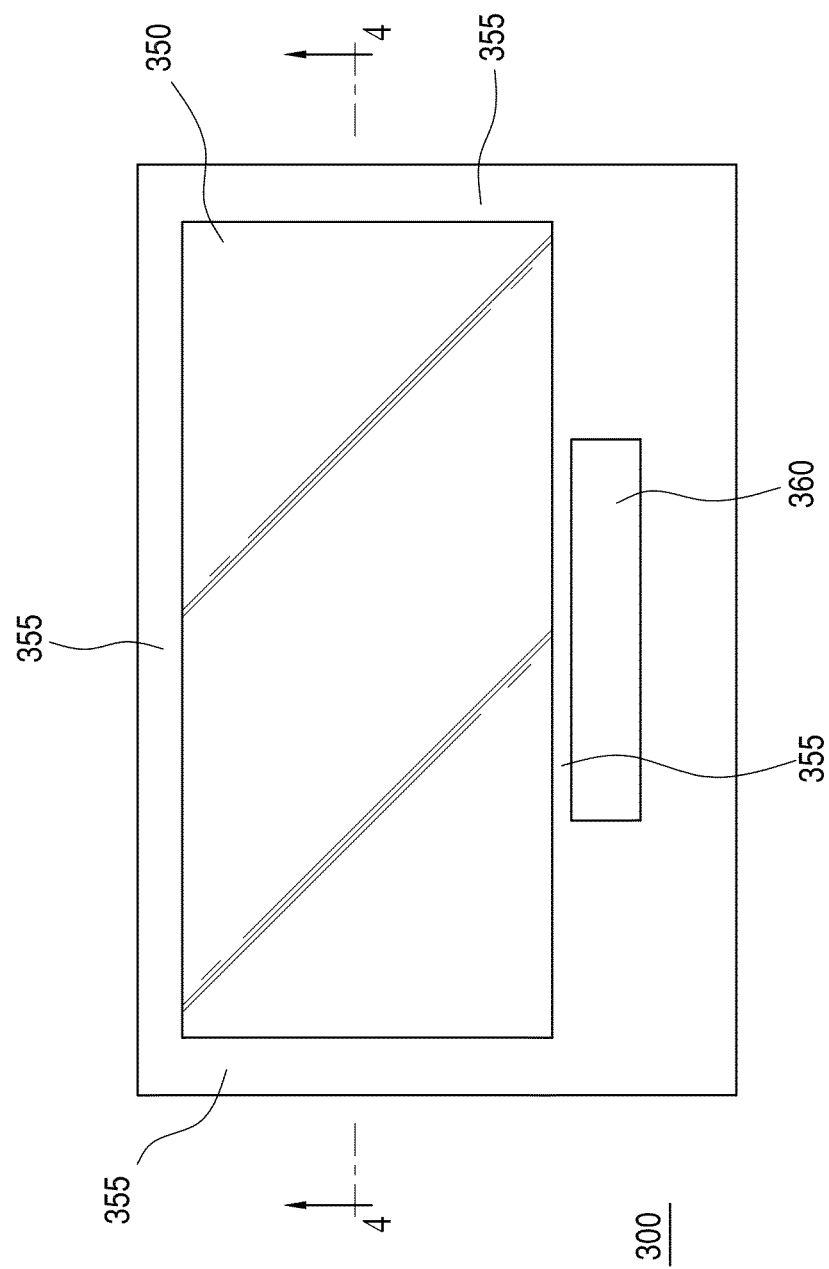
FIG. 3 is an example illustrating a support, according to a first embodiment.

FIG. 3 illustrates an example of a support 300, according to a first embodiment of the invention. Support 300 can comprise any rigid material that would act as a suitable support. In some examples, support 300 is acrylic. The thickness of support 300 will define the gap between the color filter and the display surface during the alignment operation. The thickness can be any value that enables the optical evaluation system with sufficient depth of field.

In many embodiments, support 300 is configured to receive the color filter array and assist in aligning the color filter array with the pixels of the display. In the same or different embodiments, support 300 comprises a body 355 and a filter opening 350. The color filter array substrate can be placed on body 355 such that the color filter array is visible through filter opening 350. In some embodiments, filter opening 350 can be larger than the size of the printed area of the color filter array, thus allowing ease of positioning the color filter array. In further embodiments, the border area of the color filter array can be coupled to support 300 at two or more of its edges to body 355 of filter support 300.

In some embodiments, support 300 can include one or more cutouts. Cutouts can be used to ensure that support 300 does not damage portions of the display when support 300 is placed over the display. In addition, cutouts can assist in keeping support 300, and by extension the color filter array, level when support 300 is placed over the display. As an example, support 300 of FIG. 3 includes a cutout 360. Cutout 360 can be configured so that portions of the display that extend vertically outward from a plane in which the face of the display lies will align with cutout 360. For example, cutout 360 can be configured so that the driver die of the display will fit inside cutout 360 and so that the driver die will not be damaged and/or disrupt the aligning of the color filter array.

The color filter array can be coupled to support 300 via an adhesive. For example, when the color filter array has an adhesive side as mentioned above, the color filter array can be placed over filter opening 350 of support 300. The border of the color filter array will overlap the edges of filter opening 350. The portions of the color filter substrate that are outside the area of filter opening 350 are then coupled to body 355 with the aid of the adhesive. In some embodiments, there is no adhesive side to the color filter array, and therefore, an adhesive is added to couple the color filter array to support 300. In other embodiments, no adhesive is used to couple the color filter array to support 300. An example of a suitable adhesive is Optically Clear Adhesive 8172 manufactured by 3M Corp. of St Paul, Minn.

In some embodiments, the color filter array can be centered over filter opening 350. In addition, in the same or other embodiments, the color filter array is tautly coupled to support 300. As an example, the color filter array can be taut so that the color filter array does not sag in the center of the color filter array. Sagging can cause the color filter array to make contact with the display before alignment of the color filter display is finished.

In some embodiments, support 300 can comprise a marker to ensure that the color filter array is properly oriented when coupled to support 300, as most color filter array patterns are not rotationally symmetric. As an example, a marker can be located at one of the corners of support 300. In addition, the color filter array can have a matching marker at one of its corners. When coupling the color filter array to support 300, the corner of the color filter array with the marker should be coupled to support 300 at the corner of filter opening 350 that has the matching marker. The marker can be any symbol, shape, or fiducial, and can be present in any suitable color.

In many embodiments, after the color filter array has been coupled to support 300, support 300 and the color filter array are placed over the display. In some embodiments, support 300 is placed over the display so that all of the pixels of the display are located directly beneath filter opening 350. In such an alignment, light passes through filter opening 350 and through the color filter array pixels. Light that is reflected from the lighter tone backplane pixels of the display will return rays through the color filter again and can be used to evaluate the alignment of the color filter array. In some examples, the display may actively emit light and the CFA alignment is evaluated by the hue of rays emitted by brighter pixels filtered through the color filters. In some examples, support 300 will rest against the display.

In some embodiments, the display can be removably coupled to a baseplate. The baseplate can be used to give support to the display and allow for movement of the display if necessary when aligning the color filter array. In addition, the baseplate can help prevent the display from shifting during the alignment and the coupling of the color filter array to the display. In some examples, the display is coupled to the baseplate by asserting a vacuum. In other examples, a vacuum is not used. In the same or other examples, gravity, mechanical pressure, adhesives, or other means can be used to couple the display to the baseplate. The baseplate may comprise micro-positioners to facilitate small changes in relative position between the display and the color filter. For example, it can be useful to have micro-positioners for translation of the display and/or color filter array in x and y directions, as well as rotationally.

Figure 21:
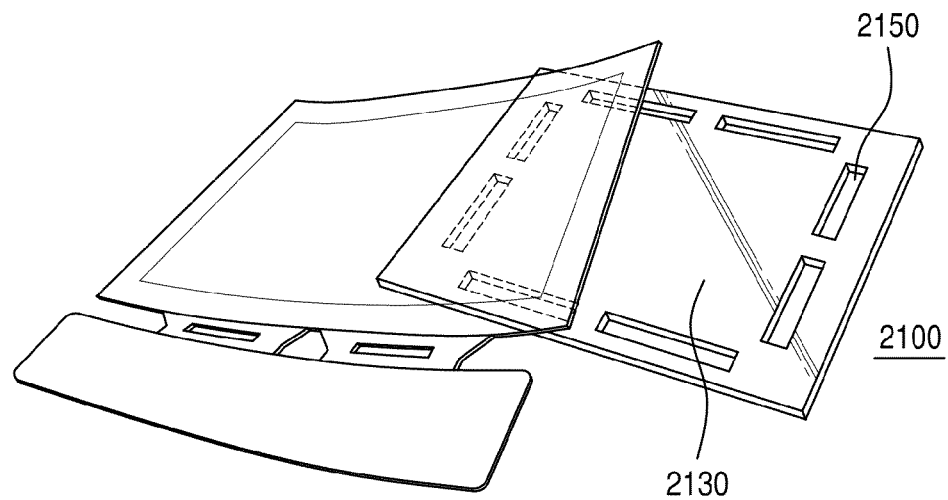
FIG. 21 illustrates a plastic riser, according to a first embodiment.

In some embodiments, the display can be removably coupled to a plastic riser 2100 (FIG. 21) to provide a vertical gap for the tape automated bonded (TAB) integrated circuits (ICs) of the display. In the same or different embodiments, plastic riser 2100 can be removably coupled to the baseplate. In some embodiments, plastic riser 2100 can have a body 2130 and at least one cutout 2150 so that portions of the display that extend vertically outward from a plane in which the face of the display lies will align with cutout 2150. In some embodiments, plastic riser 2100 can have eight cutouts. In the same or different embodiments, adding plastic riser 2100 to the display can prevent damage to the TAB ICs of the display during procedure 140 of method 100 as described below. In the same or different embodiments, the display can be removably coupled to plastic riser 2100 and plastic riser 2100 can be removably coupled to the baseplate in the same manner and for the same reasons as provided above for removably coupling the display to the baseplate. In some embodiments, where the corners or edges of the display curl away from the baseplate or plastic riser 2100, tape can be applied to the corners or edges of the display to further couple the display to the baseplate or plastic riser 2100. In still further embodiments, the display can be sprayed with air or blotted with tape to remove dust from the display.

Figure 4:
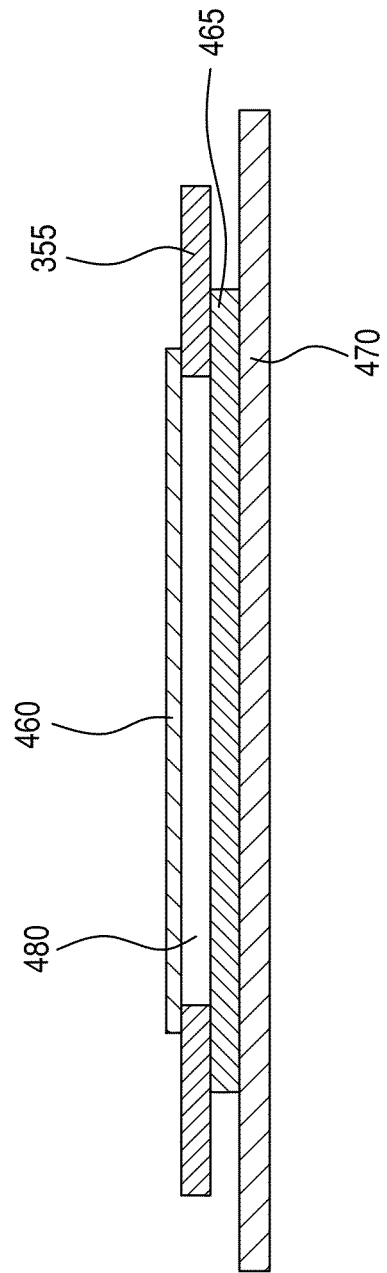
FIG. 4 is an example illustrating a cross-sectional view of the example of FIG. 3, along with a color filter array, a display, and a baseplate.

FIG. 4 illustrates a cross sectional view of support 300, taken at lines "4" of FIG. 3, after a color filter array 460 has been coupled to support 300. As described above, color filter array 460 is coupled to body 355 beyond the edges of filter opening 350. In some embodiments, support 300 can be positioned over a display 465 so that all the pixels of display 465 are positioned within the perimeter of filter opening 350. In the same or different embodiments, display 465 can be coupled to a baseplate 470.

Also, as can be seen in FIG. 4, there can be a distance 480 between color filter array 460 and display 465. In various embodiments, distance 480 can vary according to the materials used for support 355. In other embodiments, distance 480 can be adjusted so that color filter array 460 does not contact display 465 before alignment has been completed. Distance 480 can be varied by increasing or decreasing the thickness of support 300. In some examples, support 300 is approximately 1.5 millimeters (mm) thick. The thickness of support 300 can be adjusted as necessary to prevent early contact between the color filter array and the display. In addition, the thickness of support 300 can be adjusted as necessary for optical evaluation of the alignment of the display.

Figure 22:
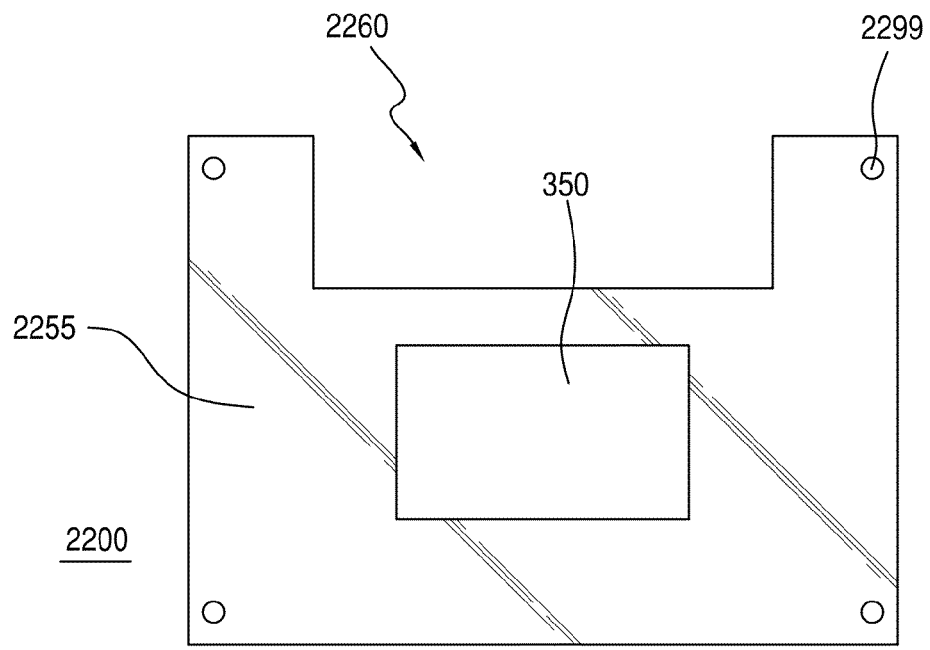
FIG. 22 illustrates a support, according to a second embodiment.

Referring back to the figures, FIG. 22 illustrates an example of a support 2200 according to a second embodiment of the invention. In many embodiments, support 2200 can be similar to support 300. In many embodiments, support 2200 comprises a body 2255 and filter opening 350. In the same or different embodiments, support 2200 further comprises cutout 2260. In many embodiments, cutout 2260 can provide similar functions to the cutouts of support 300. In the same or different embodiments, support 2200 further comprises holes 2299.

Figure 23:
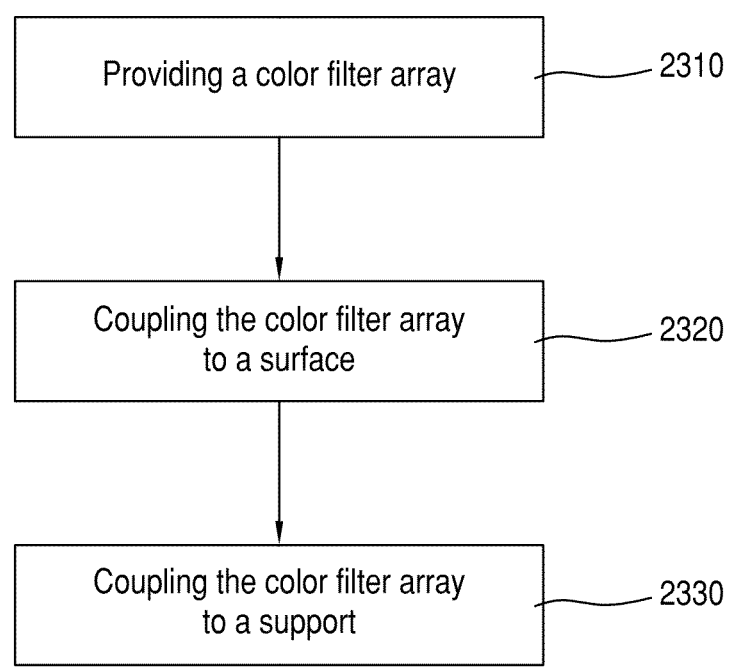
FIG. 23 illustrates a flow chart illustrating an example of a procedure of positioning the color filter array over the display, according to one embodiment.

In some embodiments, procedure 120 (FIG. 1) of positioning the color filter array over the display can comprise a process 2310 (FIG. 23). FIG. 23 illustrates procedure 120 of positioning the color filter array, according to one embodiment.

In many embodiments, process 2310 can comprise providing a color filter array. In many embodiments, the color filter array can be similar to color filter array 1300 as described above. In some embodiments, process 2310 of providing a color filter array can comprise peeling a color filter array from a backing sheet. In the same or different embodiments, the color filter array can have a first side and a second side. In some embodiments, the first side of the color filter array can have an adhesive. In the same or different embodiments, the second side of the color filter array does not have an adhesive. In some embodiments, the color filter array can be peeled away from the backing sheet and held in a manner so as to avoid making finger prints on the printed area of the color filter array.

Referring back to FIG. 23, in some embodiments, procedure 120 can continue with a process 2320 comprising coupling the color filter array to a surface. In some embodiments, process 2320 of coupling the color filter array to a surface can comprise coupling the second side of the color filter array to a surface so that the first side of the color filter array faces away from the surface. In some embodiments, the color filter array can be coupled to the surface using a vacuum line. In some embodiments, the color filter array can be centered over an opening in the surface. In some embodiments, the surface can comprise holder 1445 (FIG. 14) as described below. In some embodiments, process 2320 can be omitted from procedure 120.

Referring back to FIG. 23, in some embodiments, procedure 120 can continue with a process 2330 comprising coupling the color filter array to a support. In many embodiments, the support can be similar to support 2200 (FIG. 22) as described above. In other embodiments, the support can be similar to support 300 (FIG. 3) as described above. In some embodiments, coupling the color filter array can comprise aligning a first marker on the color filter array with a second marker on the support. In the same or different embodiments, coupling a color filter array can comprise aligning a black, dark, or other border of the color filtered array with an opening in the support. In the same or different embodiments, coupling the color filter array can comprise lowing the support and pressing it onto the color filtered array to bond the color filter array to the support. In some embodiments, the adhesive of the color filter array bonds the color filter array to the support. In some embodiments, at least two of processes 2310, 2320, and 2330 can occur simultaneously with each other.

In many embodiments, after support 300 (FIG. 3) and color filter array 460 (FIG. 4) have been placed over display 465 (FIG. 4), procedure 120 (FIG. 1) is complete. Next, in some embodiments, method 100 can continue with a procedure 130 of aligning the color filter array. Aligning the color filter array can include moving the color filter array and/or the display.

Figure 5:
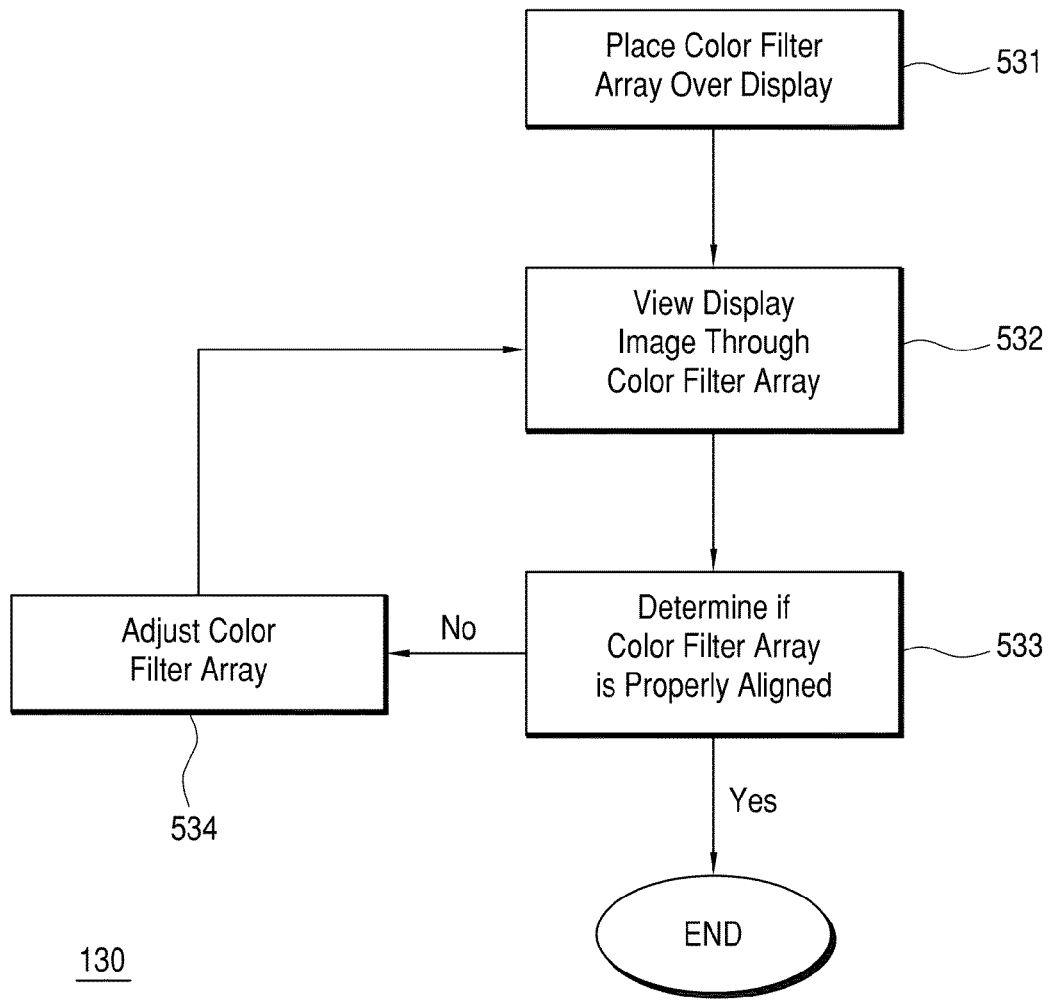
FIG. 5 is a flow chart illustrating an example of a procedure of aligning a color filter array, according to a first embodiment.

FIG. 5 illustrates an example of procedure 130 of aligning a color filter. In many embodiments, procedure 130 can include a process 531 of placing the color filter array over the display. Process 531 can be similar to or the same as procedure 120 of FIG. 1 above.

In some embodiments, after process 531, procedure 130 can continue with a process 532 of evaluating the display image through the color filter array. The color filter array can be the same as or similar to color filter array 460 (FIG. 4), and the display can be the same as or similar to display 465 (FIG. 4).

The display displays the image created in procedure 110 (FIG. 1). In the case of a reflective display, light that is reflected from the pixels driven with the bright tones from the image while light is absorbed at the pixels driven with dark tones from the image. Reflected light rays pass through the color filter array and are readily evaluated.

The image that is displayed from procedure 110 (FIG. 1) can be evaluated through a variety of means. In some embodiments, if the image is too bright, the $V_{dd}$ can be reduced until the image can be readily seen. For example, if the pixels are large enough, the naked eye can be used. In the same or different examples, a microscope can be used to view the image and evaluate the alignment of individual pixels. In the same or different examples, color-filtered photocells can be used to evaluate the image and the resulting hue of individual color display pixels. In the same or different examples, a color analyzer can be used, such as, for example, a Konica-Minolta CA-2000 provided by Konica-Minolta USA of Ramsey, N.J. In some examples, some combination of at least the naked eye, a microscope, color-filtered photocells, and a color analyzer can be used to evaluate the image and the resulting hue of individual color display pixels. In one particular example, a microscope with approximately 20 to approximately 40 times magnification is used when 240 micrometer pixels are used in the display. In other examples, a digital camera can be used. In another particular example, a digital single lens reflex (SLR) camera with a video output feature and a macro lens is used. The live video feed from the camera is displayed on a computer monitor during the alignment procedure. As an example, the camera system components can include a Canon T1i camera and lens, both of Canon U.S.A., Inc. of Lake Success, N.Y., and the computer system can operate a DSLR Remote Pro software program for the video display.

Figure 24:
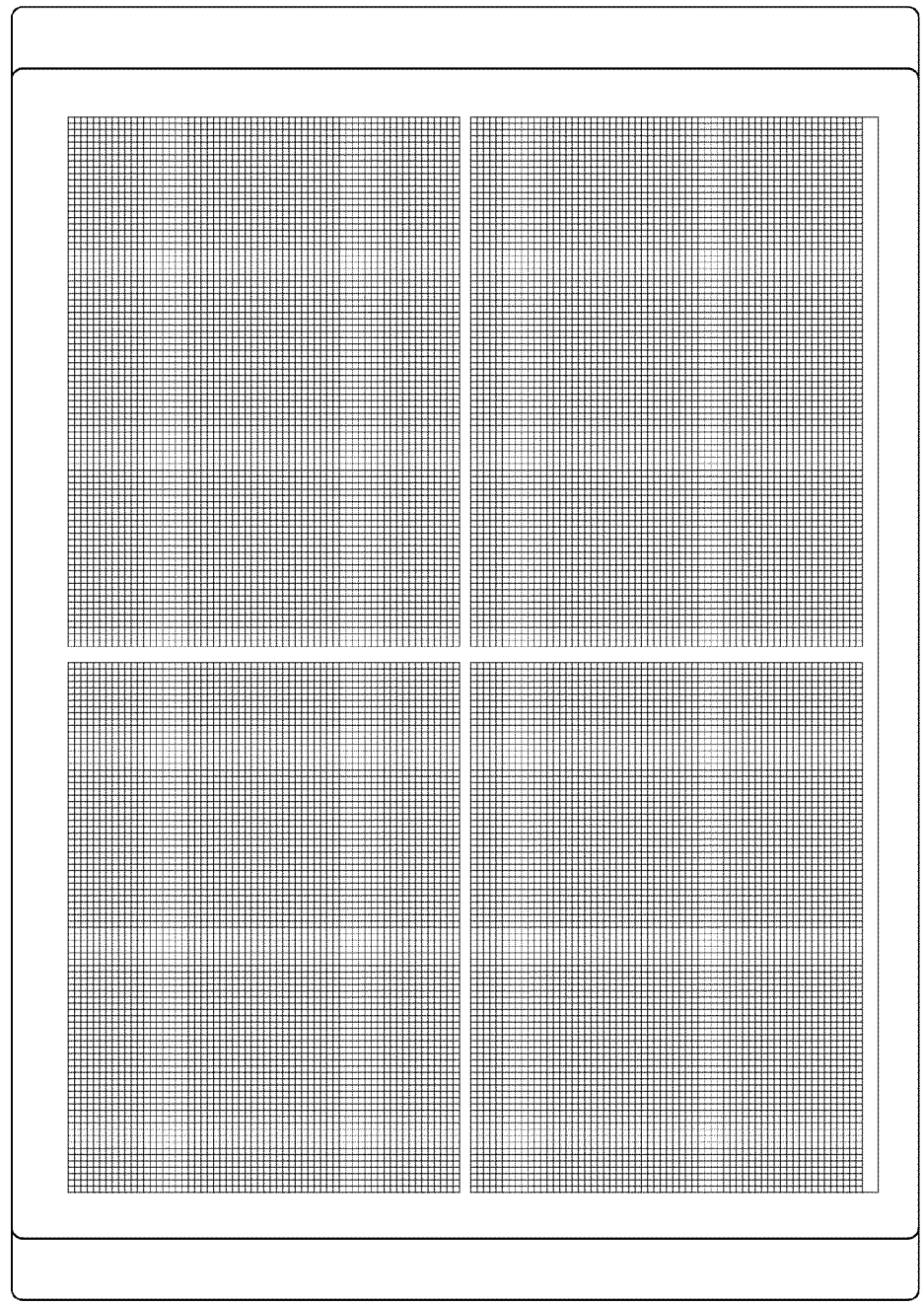
FIG. 24 illustrates a display having bright tones in a cross pattern and an artifact line of bright tones along an edge of the display.

Next, in some embodiments, procedure 130 can continue with a process 533 of determining if the color filter array is properly aligned. In some embodiments, determining if the color filter array is properly aligned comprises aligning the color filter pixel occupying the first row and the first column of the color filter array with the bright tone occupying the first row and the first column of the display. In the same or different embodiments, the bright tone occupying the first row and the first column of the display can be located in the bottom left corner of the display. In other embodiments, the bright tone occupying the first row and the first column of the display can be located in the upper left corner of the display. The alignment quality is judged based on purity of the color of the image viewed through the color filter array. In some embodiments, where the display is displaying an image having an artifact line along the bottom row of the display (FIG. 24) such that the bright tone occupying the first row and the first column of the display is difficult to discern, using an image having bright tones in a cross pattern and for a selected pixel color can help to align the color filter array to the display. In the same or different embodiments, determining if the color filter array is properly aligned comprises visually following the cross pattern along the ends of the rows and columns to determine that the color pattern of pixels of the outer rows and columns of the cross remains constant along each row and/or column. In the same or different embodiments, if the color filter array is not rotationally aligned to the display, the color pattern will appear to drift into adjacent rows and/or columns. In the same or different embodiments, after determining that the pixels of the outer rows and columns of the cross do not drift into the center row and column of the cross, the color filter pixel occupying the first row and the first column of the color filter array can be checked to ensure it is properly aligned with the bright tone occupying the first row and the first column of the display.

Figure 6:
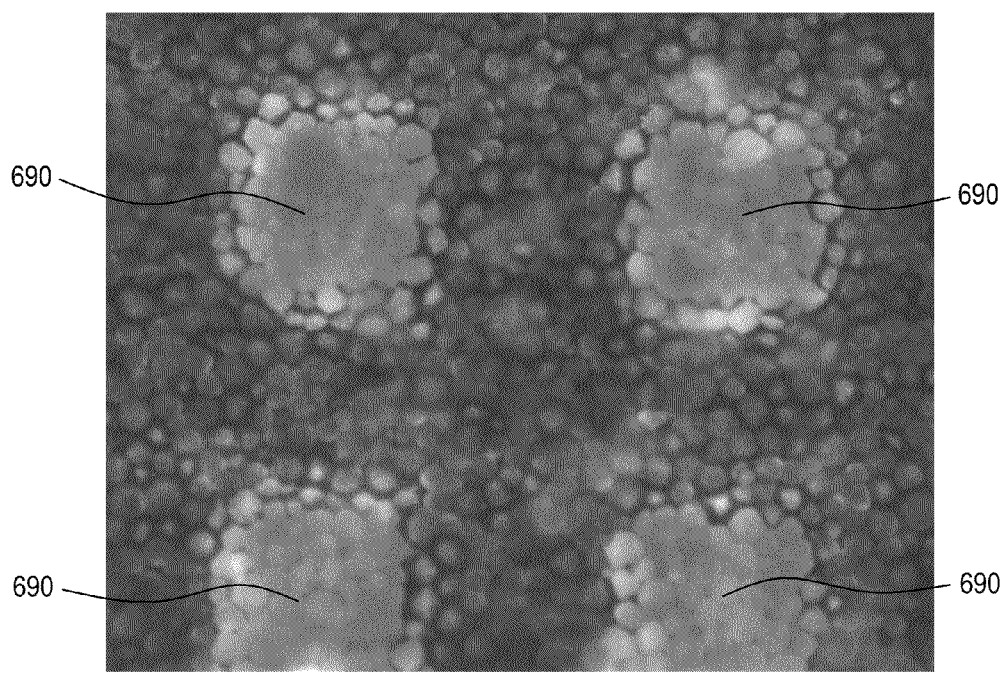
FIG. 6 is an example illustrating a properly aligned color filter array.
Figure 12:
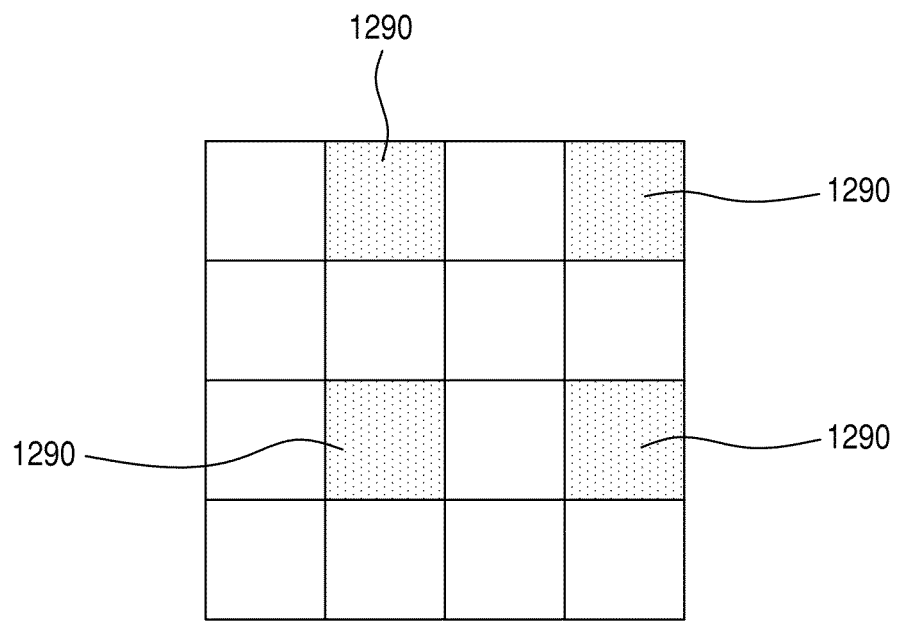
FIG. 12 is an example of backplane pixels displaying an image, according to one embodiment.

In various embodiments, where the image has been designed to have bright tones only for color filter pixels of a selected color from the color filter sub pattern, an aligned color display assembly will appear to be a single color image on the display. For example, if the selected color is red, the color display assembly will appear to be displaying a solid red image when properly aligned. FIG. 12 illustrates an example of backplane pixels displaying an image for a Bayer pattern color filter array's red pixels. The areas marked 1290 represent the backplane pixels displaying bright tones. FIG. 6 shows an example of a properly aligned Bayer pattern color filter array over the backplane pixels of FIG. 12. Each of the areas labeled 690 represents a red area of the color filter array that is properly aligned over the pixels 1290. In other embodiments, where the image has been designed to have bright tones only for color filter pixels of a selected color from the color filter sub-pattern and for a cross of three or more rows and three or more columns, an aligned color display assembly will appear to be a single color image on the display, except for the pixels above the cross pattern where the image will appear as each of the colors of the display.

Returning to FIG. 5, if the color filter array is not properly aligned, procedure 130 proceeds to a process 534 of adjusting the color filter array. Adjusting the color filter array comprises moving the color filter array, which can include moving the support that is coupled to the color filter array. The color filter array can be moved in any direction that is in the same plane as the color filter array. In other embodiments, the display is moved, or both the display and the color filter/support are moved.

Figure 7:
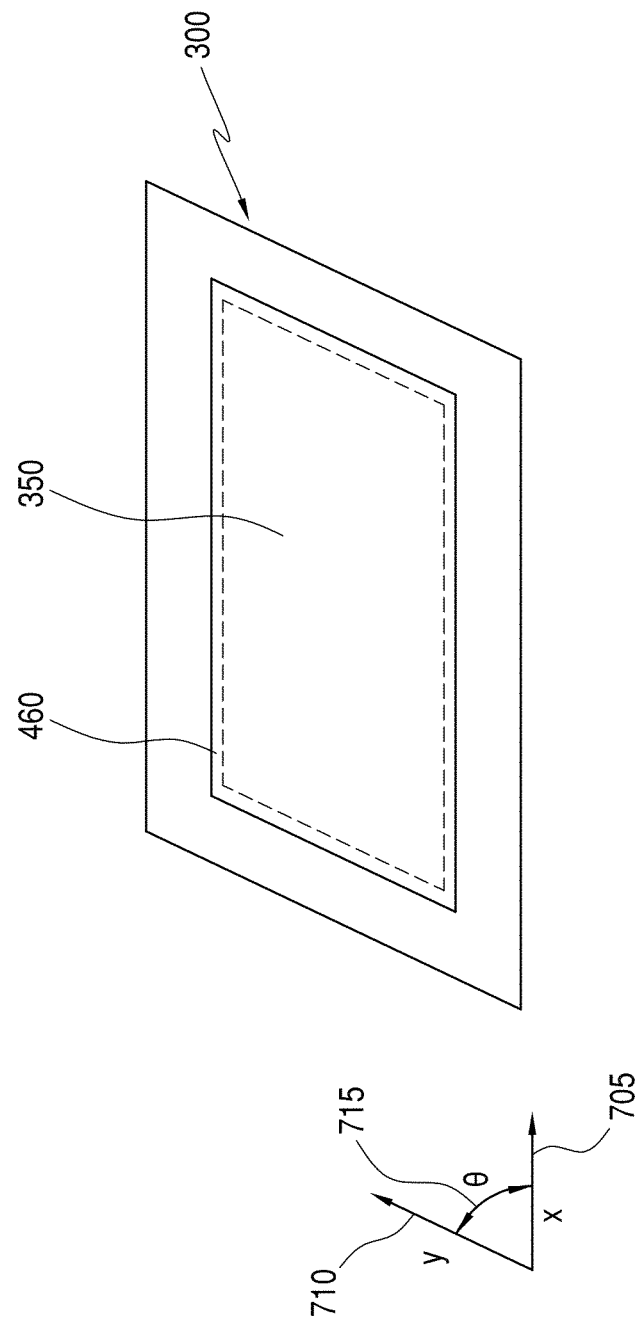
FIG. 7 is an illustration of the color filter array of FIG. 3 coupled to a support, according to one embodiment.

As an example, FIG. 7 shows color filter array 460 coupled to support 300 over filter opening 350. To align color filter array 460, support 300 can be moved relative to an underlying display in a direction along an x-axis 705, along a y-axis 710, or in any direction that is a combination of x-axis 705 and y-axis 710, i.e., a translation. In addition, support 300 and color filter array 460 can be rotated. When color filter array 460 is rotated, color filter array 460 moves in a θ-direction 715. In some embodiments, where the display is showing bright tones for a selected pixel color in addition to a cross pattern, the rotation of the color filtered array can be adjusted such that the selected pixel color does not drift into the center row of the cross pattern.

Returning again to FIG. 5, after the color filter array is adjusted in process 534, procedure 130 once again proceeds to process 532 of evaluating the display image through the color filter array. In some embodiments, procedure 130 continues until the color filter array is properly aligned as determined by process 533. In many embodiments, once the color filter array is properly aligned, procedure 130 is complete.

It should be noted that the order of the processes in procedure 130 can be altered. For example, some of the processes can occur before or after the time they occur in procedure 130. For example, process 534 can occur before 532. In addition, some of the processes can occur at the same time. For example, the image can be evaluated through the color filter array (process 532) while the color filter array is being adjusted (process 534). Furthermore, a user can determine whether the color filter array is properly aligned (process 533) while performing process 532 and/or process 534.

Next, in many embodiments, method 100 of FIG. 1 can continue with a procedure 140 of coupling the color filter array and the display. In many embodiments, after the color filter array has been properly aligned with the display, the color filter array needs to be coupled to the display, and/or vice versa. In some embodiments, lamination techniques can be used to couple the color filter array to the display.

In one embodiment, the color filter array can be coupled to the display by hand. A user can gently put force or pressure on the color filter array until it comes in contact with the display. In one example, a conformal roller is used to adhere the color filter array to the display. In some examples, the conformal roller is used to couple the color filter array to the display from the center out towards the edges. In the same or different examples, coupling a plastic riser such as plastic riser 2100 (FIG. 21) to the bottom of the color filter array can protect the TAB ICs from being damaged under the pressure of the conformal roller.

An adhesive can be used to couple the color filter array to the display. In some examples, the adhesive is present on an adhesive side of the color filter array before the color filter array is coupled to the display and/or support. In the same or other examples, the adhesive comprises an optically clear adhesive.

In another embodiment, the color filter array can be coupled to the display using a coupling member. An example of such a coupling member is an air blade. An air blade can use air that is blown onto the color filter array to force the color filter array onto the display. If an adhesive was not previously integrated with the color filter array or otherwise used to couple the color filter array to the display, clips or other mechanical mechanisms to retain the color filter array and display in their coupled position are then applied.

It should be noted that when the color filter array is being coupled to the display, care should be taken to avoid the presence of air bubbles being trapped between the color filter array and the display. Air bubbles that are trapped between the color filter array and the display can cause perceptual artifacts in the assembled display, among other problems.

After the color filter array is coupled to the display, the display and color filter array can be released from their supports. In some examples, the color filter array is removed from the support by cutting the color filter array along the edges of the filter opening of the support and the display is released by disabling the vacuum retention. In some examples, the color filter array can be cut from the support using a razor blade.

In some embodiments, procedure 140 is complete after the color filter array has been attached to the display and the display is removed from any baseplate.

In many embodiments, after procedure 140, method 100 (FIG. 1) is complete. It should be noted that, although the procedures of method 100 occur in a specific order according to FIG. 1, the order of the procedures can be varied. For example, procedure 120 can occur before procedure 110.

Although the methods disclosed herein may be used when aligning a color filter array over an LCD, traditional methods used to align a color filter array over an LCD will not work for displays in which an opaque material prevents the backplane from being viewed through the color filter array. In traditional LCD alignment methods, the LCD material is not present between the backplane and the color filter array.

Figure 8:
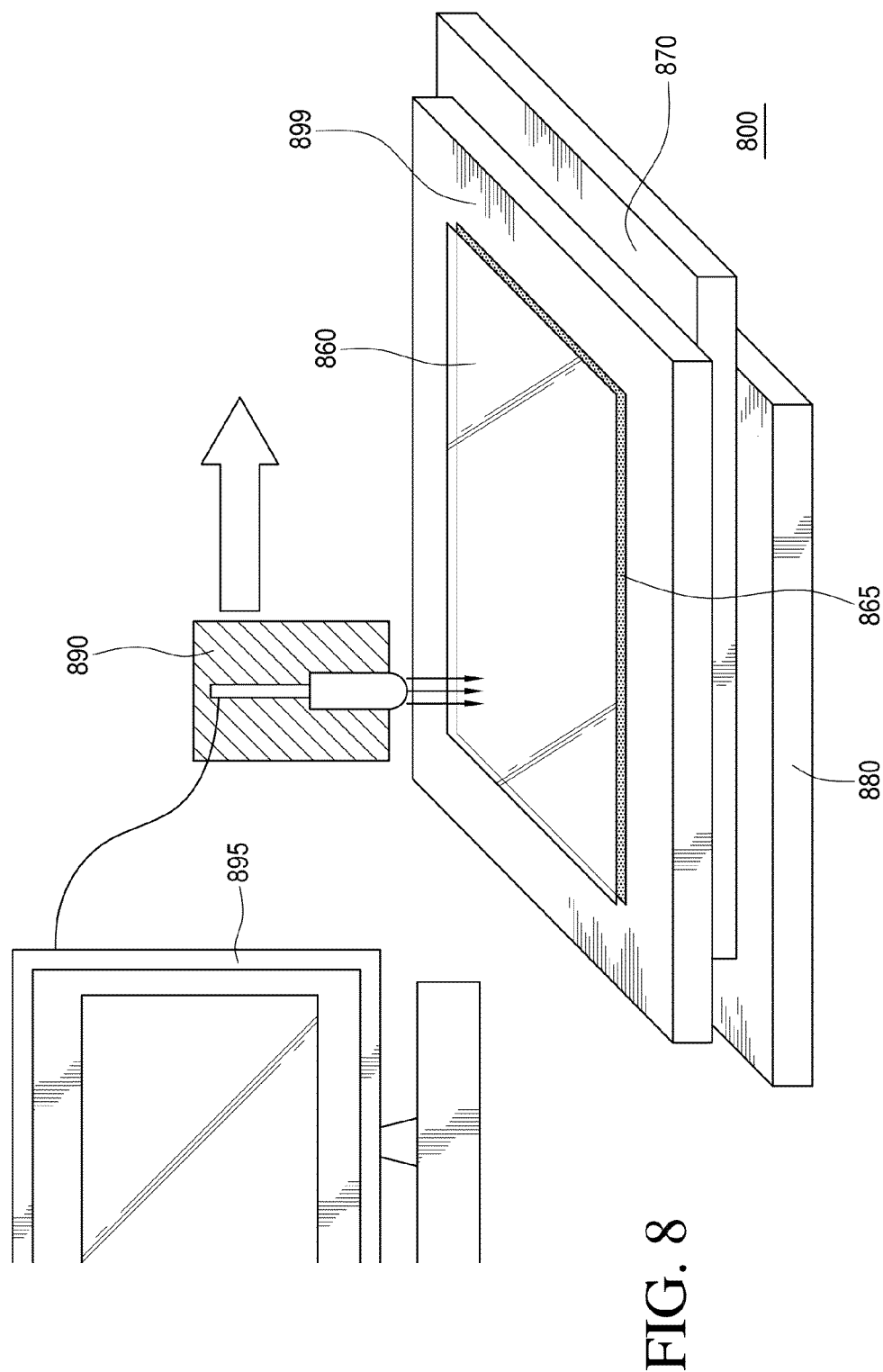
FIG. 8 is an example of a system for aligning a color filter array over a display, according to a first embodiment.

FIG. 8 shows an example of a system 800 for aligning a color filter array, according to a first embodiment. In the same or different embodiments, system 800 can be considered a system for aligning a color filter array to a display when the pixels are not readily visible. System 800 can also be considered a system for coupling a color filter array to a monochromatic display. System 800 is merely exemplary and is not limited to the embodiments presented herein. System 800 can be employed in many different embodiments or examples not specifically depicted or described herein.

System 800 includes a baseplate 899 mounted on a translation stage. Baseplate 899 is mounted to an orthogonal translation stage 870, and translation stage 870 is mounted to a rotation stage 880. Baseplate 899 can be the same as or similar to baseplate 470 (FIG. 4). In addition, system 800 can also include an optical detector 890 and a control unit 895.

System 800 uses baseplate 899 that supports a display 865. The display can be the same as or similar to display 465 (FIG. 4). Baseplate 899 can be coupled to the display via the use of a vacuum device (not shown) to prevent the display from shifting during alignment and lamination.

A support, not shown, can be coupled to a color filter array 860. Color filter array 860 can be the same as or similar to color filter array 460 (FIGS. 4 and 7). The support can be coupled to color filter array 860 as described in relation to procedure 120 (FIG. 1) above.

System 800 further includes an optical detector 890. Optical detector 890 is used to evaluate an image through color filter array 860. The image displayed and evaluated through color filter array can be the same as or similar to the image described with respect to procedure 110 (FIG. 1) and/or process 532 (FIG. 5) above. In addition, optical detector can be used to determine if color filter array 860 is properly aligned over the display. In some examples, optical detector 890 comprises a microscope and a human viewer. In other examples, optical detector 890 comprises at least one color-filtered photocell. In yet other examples, optical detector 890 comprises a color analyzer. In further examples, optical detector 890 comprises a camera with or without an attached color filter and with or without video output capability. The optical detector can be stationary or movable. System 800 can include two or more optical detectors that can be used simultaneously or sequentially.

In addition, system 800 also includes control unit 895. Control unit 895 can control the functions of system 800. In addition, control unit 895 can also be used to evaluate the alignment of color filter array 860 to the display through optical detector 890. In other embodiments, control unit 895 can be separate from a monitor that is used to evaluate the alignment of color filter array 860 to the display using light detected at optical detector 890. In some examples, control unit 895 comprises a computer system.

Optical detector 890 gathers light from the display through color filter array 860. The characteristics of the detected light can be evaluated on control unit 895. In some embodiments, optical detector moves along color filter array 860 to take readings at more than one location. In other embodiments, optical detector 890 is positioned in one location to capture images of the whole display through whole color filter array 860. In the same or other embodiments, optical detector 890 can comprise more than one element, such as, for example, multiple color-filtered photocells, each positioned in one location to take multiple readings of color filter array 860.

A user can use the readings taken by optical detector 890 to adjust the position of color filter array 860. The adjustment of color filter array 860 can be the same as or similar to process 534 (FIG. 5) as describe above. In some embodiments, the user can manually adjust the position of baseplate 899 and, therefore, the position of display 865. In other embodiments, control unit 895 can evaluate the data received by optical detector 890 and automatically control the alignment of display 865 beneath the static position of color filter array 860. Display 865 can be adjusted by moving baseplate 899, in an x-direction (element 705 of FIG. 7), stage 870 in a y-direction (element 710 of FIG. 7), and stage 880 in a 0 direction (element 715 of FIG. 7), or combinations thereof. In other embodiments, the system may hold the display in a static position and adjust the position of the color filter array instead. In a further embodiment, the positions of both the display and the color filter array are adjusted.

Figure 9:
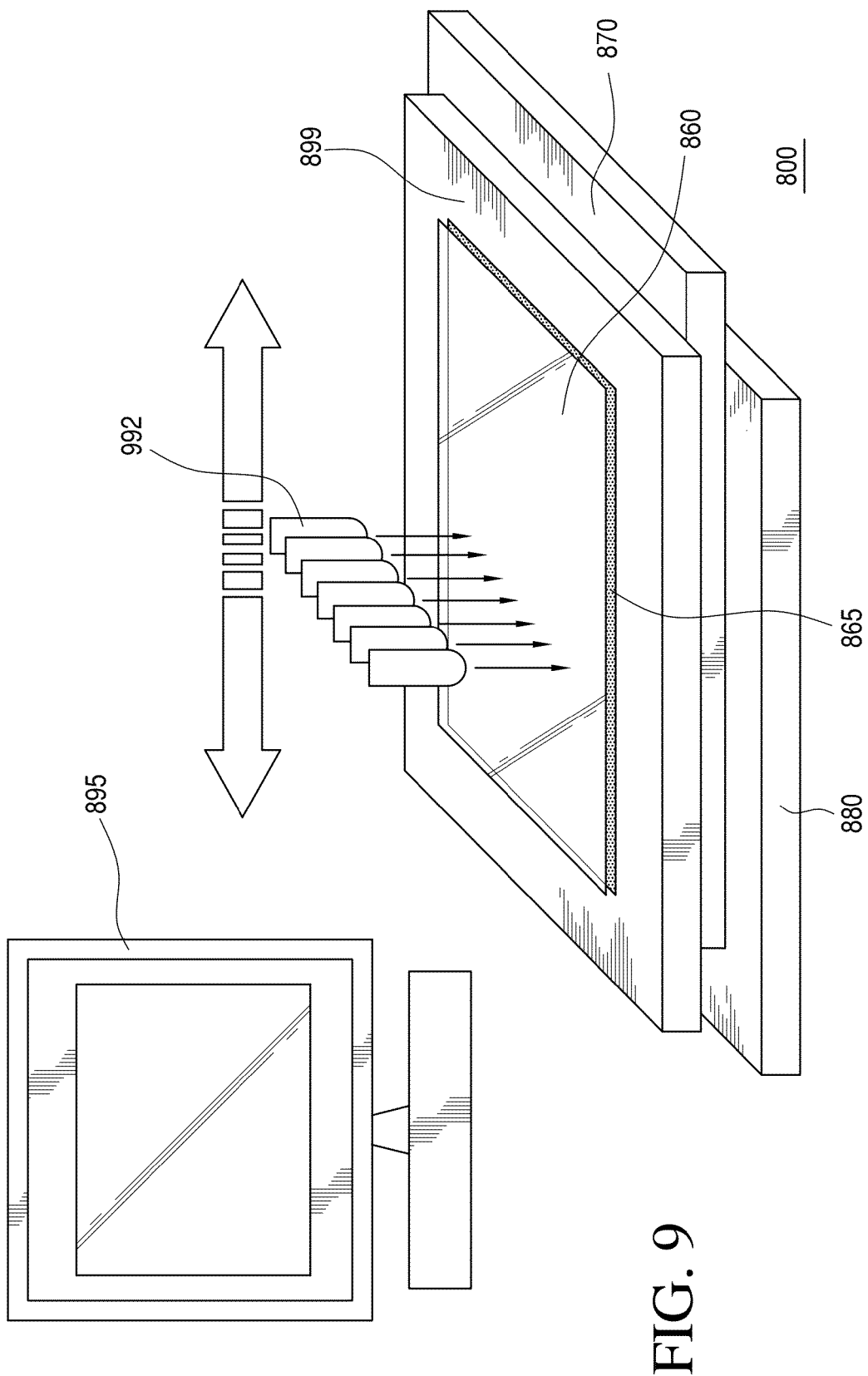
FIG. 9 is an illustration of the operation of the system of FIG. 8 for aligning the color filter array over the display.

With reference to FIG. 9, system 800, in another embodiment, can also include a multiple optical detector assembly 992. Multiple optical detector assembly member 992 can be used to make multiple readings at once of the state of alignment of color filter array 860 to the display. The procedure of reading and evaluating the data from the multiple optical detector assembly can be the same as or similar to procedure 130 (FIG. 1) as discussed above.

In some examples, a coupling member, not shown, can comprise a roller that rolls over color filter array 860 until color filter array is completely coupled to the display. In some embodiments, the coupling member is controlled by control unit 895. In other embodiments, the coupling member is controlled by the user.

Figure 19:
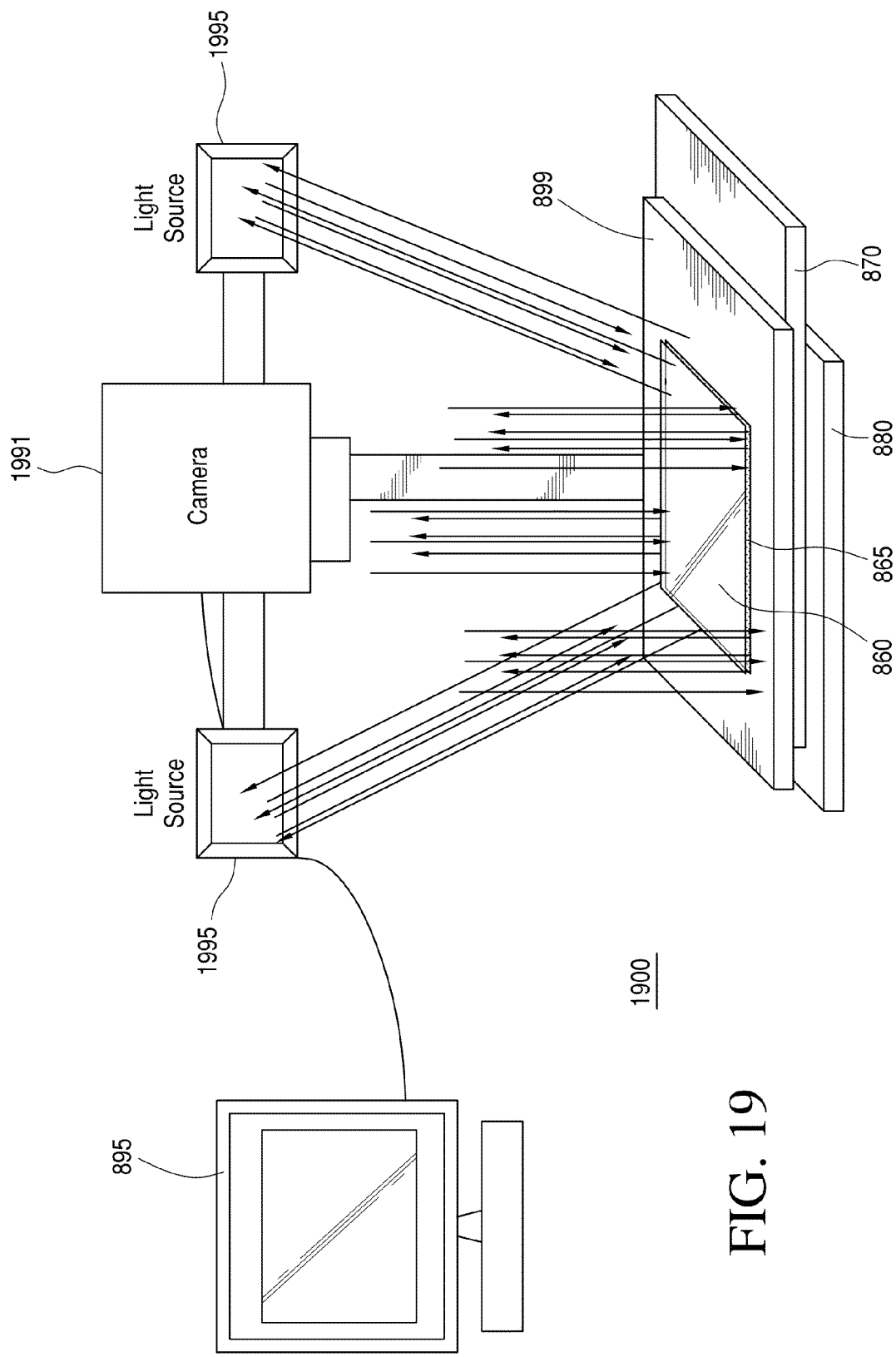
FIG. 19 is a third example of a system for aligning a color filter array over a display, according to a third embodiment.

Jumping ahead to FIG. 19, system 1900 aligns display 865 to color filter array 860 using camera 1991 and one or more light sources 1995. In some embodiments, system 1900 does not have any light sources. In the case where display 865 is a reflective display, the system also may incorporate one or more light sources 1995. As an example, FIG. 19 illustrates system 1900 to have two light sources. In particular, the two light sources can be two light emitting diode (LED) micro light sources sold by Litepanels, Inc. of Van Nuys, Calif. In the same or different example, camera 1991 can be a Canon T1i camera with a Cannon 100 millimeter macro lens. In other cases where display 865 is an emissive display, such as an OLED technology display, additional lighting from one or more light sources 1995 is not required.

Figures 14, 17:
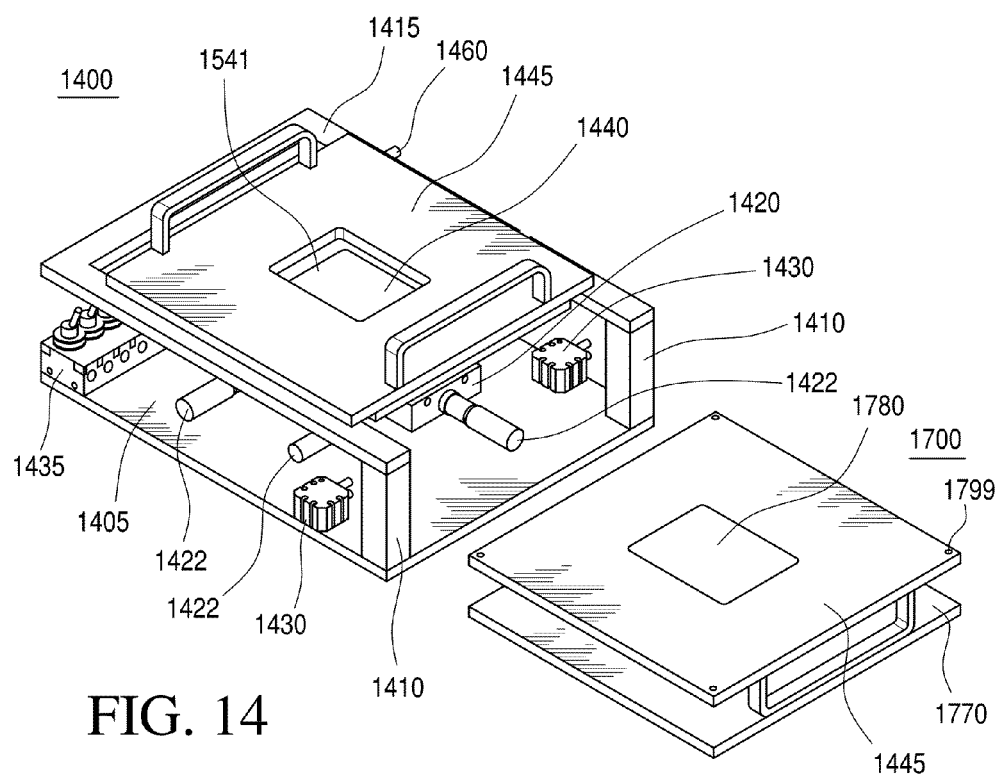
FIG. 14 is a perspective view of a second example of a system for aligning a color filter array over a display, according to a second embodiment.
FIG. 17 is a perspective view of an example of a loading assembly, according to one embodiment.

FIG. 14 shows a second example of a system 1400 for aligning a color filter array, according to a second embodiment. In the same or different embodiment, system 1400 can be considered a system for aligning a color filter array to a display when the pixels are not readily visible. System 1400 can also be considered a system for coupling one item to another. System 1400 is merely exemplary and is not limited to the embodiments presented herein. System 1400 can be employed in many different embodiments or examples not specifically depicted or described herein.

As seen in FIG. 14, in many embodiments, system 1400 can comprise a base 1405. Base 1405 can comprise any material able to support further elements of system 1400. In one embodiment, the material is lightweight, rigid, and can be easily cut. For example, base 1400 can comprise a plastic and/or a metal such as anodized aluminum.

In addition, in many embodiments, system 1400 can comprise a platform 1415. In some examples platform 1415 comprises a "u" shape. As can be seen on FIG. 14, platform 1415 has three sides and is open on the fourth side. Similar to base 1405, platform 1415 can comprise any of a variety of materials. As an example, platform 1415 can comprise a plastic and/or a metal such as anodized aluminum.

In some embodiments, platform 1415 is coupled to base 1405 via columns 1410. In various embodiments, columns 1410 can comprise any material. In some examples, columns 1410 comprise the same material as base 1405 and/or platform 1415. In other examples, columns 1410 comprise material that is different than that of base 1405 or platform 1415.

In some embodiments, system 1400 includes 3 columns that are spaced to balance platform 1415 a predetermined distance above base 1405. In other embodiments there are less than three columns 1410 and in yet other embodiments, there are greater than 3 columns 1410. Columns 1410 can be coupled to base 1405 and platform 1415 by any known means.

Figure 15:
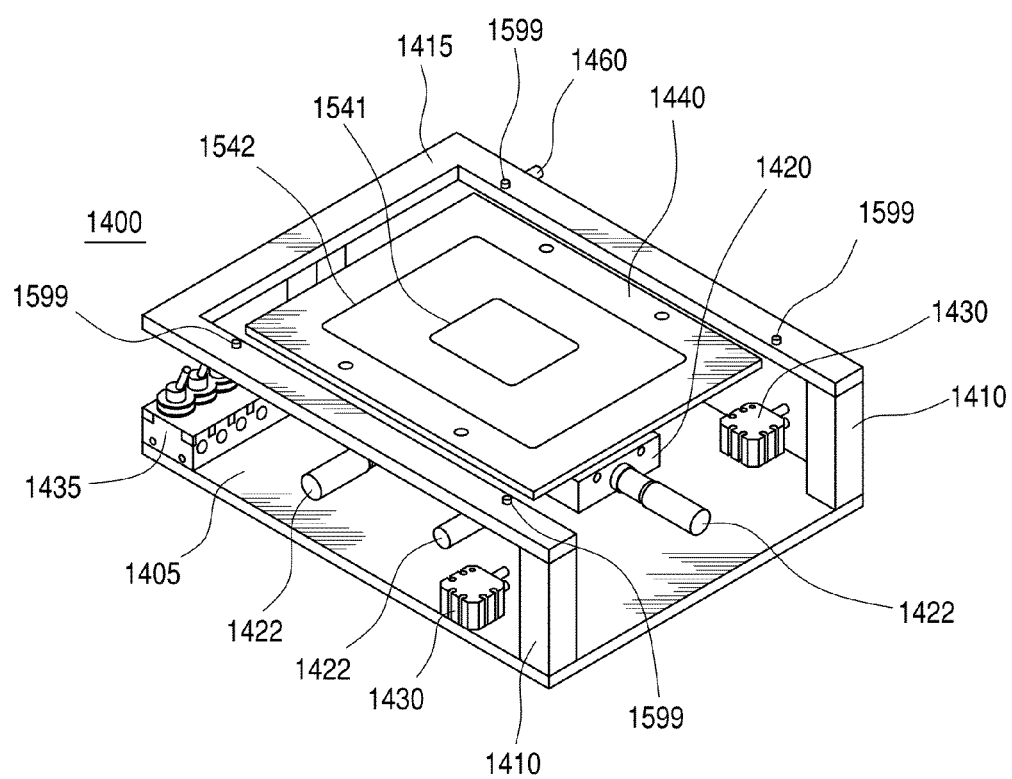
FIG. 15 is a perspective view of the system of FIG. 14 without a color filter array holder.

In addition, as best seen in FIG. 15, system 1400 can also include a chuck 1440. In many embodiments, chuck 1440 couples to a display. In many embodiments, the display can be the same as or similar to display 465 (FIG. 4). The display can be coupled to chuck 1440 by many different methods. For example, the display can be coupled to chuck 1440 with the use of a vacuum. For example, chuck 1440 has vacuum grooves or lines 1541 and 1542 (FIG. 15). Vacuum lines are connected to a vacuum via one or more vacuum ports 1460. Chuck 1440 comprises two vacuum lines to enable the user of system 1400 to use the system for a variety of different sized displays. For example, vacuum line 1541 can be used to couple smaller displays to chuck 1440. Vacuum line 1542 can be used to couple larger displays to chuck 1440. In some examples, vacuum lines 1541 and 1542 both can be used to couple a display to chuck 1440. In other examples, chuck 1440 has more than two vacuum lines. In yet other examples, chuck 1440 has only one vacuum line.

In some embodiments, the display can be coupled to plastic riser 2100 (FIG. 21) to provide a vertical gap for the TAB ICs of the display. In the same or different embodiments, plastic riser 2100 can be coupled to chuck 1440. In some embodiments, plastic riser 2100 can have at least one cutout 2150 at the corresponding location of the vacuum channel positions of the chuck. In some embodiments, where plastic riser 2100 has eight cutouts, each of the cutouts can match up with at least a portion of the channel positions of vacuum line 1541 and/or vacuum line 1542 of chuck 1440. In some embodiments, the perimeter of plastic riser 2100 can be sized to approximately the same dimensions as the area of the color filter array that will be laminated. In many embodiments, the area of the color filter array that will be laminated comprises the area of the color filter array that corresponds to the functional imaging area of the display. In the same or different embodiments, the display can be coupled to plastic riser 2100, and plastic riser 2100 can be coupled to chuck 1440 in the same manner and for the same reasons as provided above for coupling the display to chuck 1440. In some embodiments, where the corners or edges of the display curl away from chuck 1440 or plastic riser 2100, tape can be applied to the corners or edges of the display to further couple the display to chuck 1440 or plastic riser 2100. In still further embodiments, the display can be sprayed with air or blotted with tape to remove dust from the display.

In one embodiment, the active area of chuck 1440 is planar and does not have any recesses (except for the vacuum grooves or lines) to prevent air gaps from forming between the color filter array and the display during the assembly process. Vacuum lines 1541 and 1542 in the active area of chuck 1440 are small and still permit the active area of chuck 1440 to be planar and to prevent the formation of air gaps. As an example, the width of each of vacuum lines 1541 and 1542 can be approximately 0.05 inches (1.27 millimeters).

System 1400 also comprises an adjustment assembly 1420. Adjustment assembly 1420 is used to adjust the position of the display that is attached to chuck 1440 while the color filter array remains stationary over the display, as explained below. Adjustment assembly 1420 adjusts the position of chuck 1440, which in turn adjusts the assembly that is coupled to chuck 1440.

Adjustment assembly 1420 can comprise adjustment knobs 1422. Adjustment knobs 1422 can be used by an operator of system 1400 to adjust the position of the display via adjusting chuck 1440. In some examples, adjustment assembly comprises three adjustment knobs 1422. A first of the adjustment knobs 1422 can be used to adjust chuck 1440 along a first axis. A second of the adjustment knobs 1422 can be used to adjust chuck 1440 along a second axis that is perpendicular to the first axis. A third of the adjustment knobs 1422 can be used to adjust chuck 1440 rotationally. For example, the third adjustment lever can be used to adjust the angle of chuck 1440 as compared to the first axis and the second axis.

Figures 16, 18:
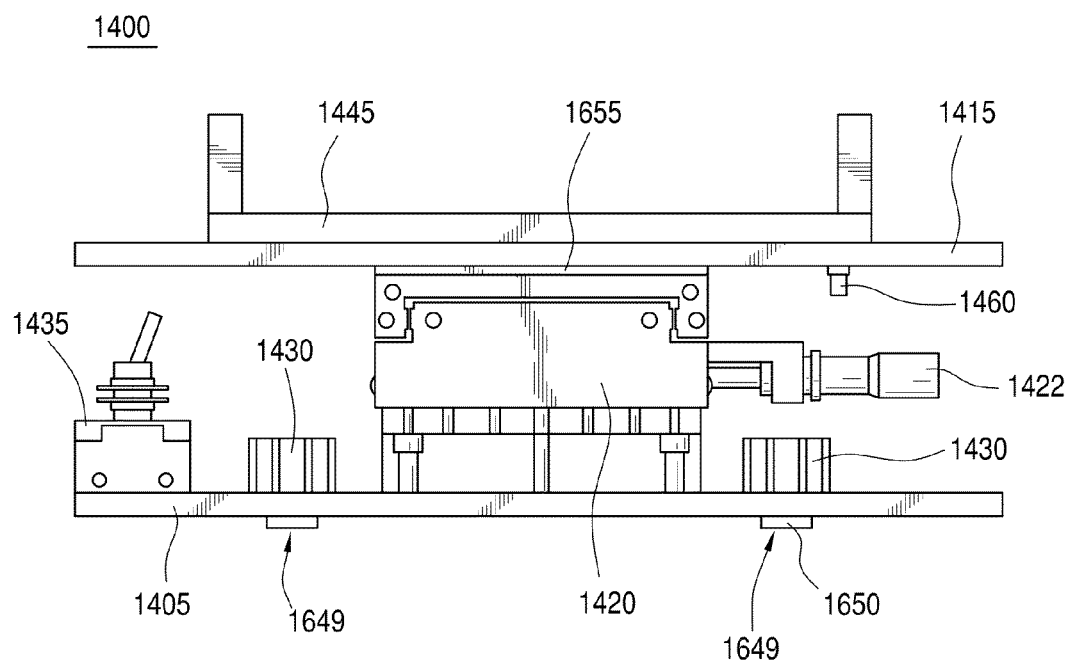
FIG. 16 is a side view of the system of FIG. 14.
FIG. 18 is a side view of the loading assembly of FIG. 17.

Adjustment assembly 1420 is coupled to base 1405 and chuck 1440. As seen in FIG. 16, in some examples, chuck 1440 is coupled to adjustment assembly 1420 via an adapter plate 1655. Adapter plate 1655 can comprise a surface that allows the display that is attached to chuck 1440 to lie flat. For example, adapter plate 1655 will ensure that chuck 1440 (and therefore the display) lies flat and level. In other examples, system 1440 does not comprise an adapter plate.

With continued reference to FIG. 14, system 1400 can have a holder 1445. Holder 1445 can be configured to hold a color filter array (CFA). As an example, the color filter array can be the same as or similar to color filter array 460 (FIGS. 4 and 7) and/or color filter array 860 (FIG. 8). In addition, holder 1445 can be configured to hold other items that are to be aligned to an item held by chuck 1440. Holder 1445 can be held over chuck 1440 by platform 1415 such that holder 1445 does not contact chuck 1440 and such that a color filter array coupled to holder 1445 does not contact a display coupled to chuck 1440. In this manner, the position of chuck 1440 and the display can be moved with respect to holder 1445 and the color filter array so that the color filter array and the display can be aligned to each other. As an example, the offset gap between the color filter array and the display can be approximately 0.01 inches (0.25 millimeters) to approximately 0.05 inches (1.27 millimeters). In the example shown in FIG. 14, holder 1445 and the color filter array coupled to holder 1445 remain stationary during the alignment process, and chuck 1440 and the display coupled to chuck 1440 are moved relative to holder 1445 and the color filter array coupled to holder 1445. In different embodiments, the display can remain stationary while the position of the color filter array is adjusted, or the positions of both the display and the color filter array are adjusted.

Holder 1445 can comprise a vacuum line. The vacuum line can be used to couple the color filter array to holder 1445. The vacuum line can be coupled to a vacuum that is used to couple the color filter array to the holder. The vacuum line can be connected to the vacuum via a vacuum port 1460 and via platform 1415.

With reference to FIGS. 17 and 18, system 1400 can also include a holder assembly 1700. Holder assembly 1700 can be used to assist the user in coupling the color filter array to holder 1445. Holder assembly 1700 can comprise a base 1770, stand-offs 1875, and a stand 1780.

As shown in FIGS. 17 and 18, holder 1445 can be coupled with holder assembly 1700. Holder 1445 can be placed over holder assembly 1700 so that holder 1445 is placed in a direction that is opposite of the way holder 1445 is placed on system 1400. For example, as shown in FIG. 14, holder 1445 can be placed on system 1400 so that a first side is in contact with platform 1415 and the color filter array, and a second side faces away from system 1400. In addition, as shown in FIG. 17, holder 1445 can be placed on holder assembly 1700 so that the second side is facing towards base 1770 and the first side is facing away from holder assembly 1700 to facilitate the placement of the color filter array on the first side of holder 1445 before holder 1445 is positioned on top of platform 1415. The first side of holder 1445 can have holes 1799 at the four corners of holder 1445.

As seen in FIG. 18, holder assembly 1700 comprises stand-offs 1875. Stand-offs 1875 are coupled to base 1770. In addition, holder assembly 1700 comprises stand 1780 (FIG. 17) that is coupled to holder assembly 1700 via stand-offs 1875. Holder 1445 can be placed over holder assembly 1700 so that stand 1780 is positioned in the middle of holder 1445, where stand 1780 and holder 1445 form a single, level surface, as shown in FIG. 17. The color filter array can then be coupled to holder 1445 with the aid of stand 1780.

Figure 25:
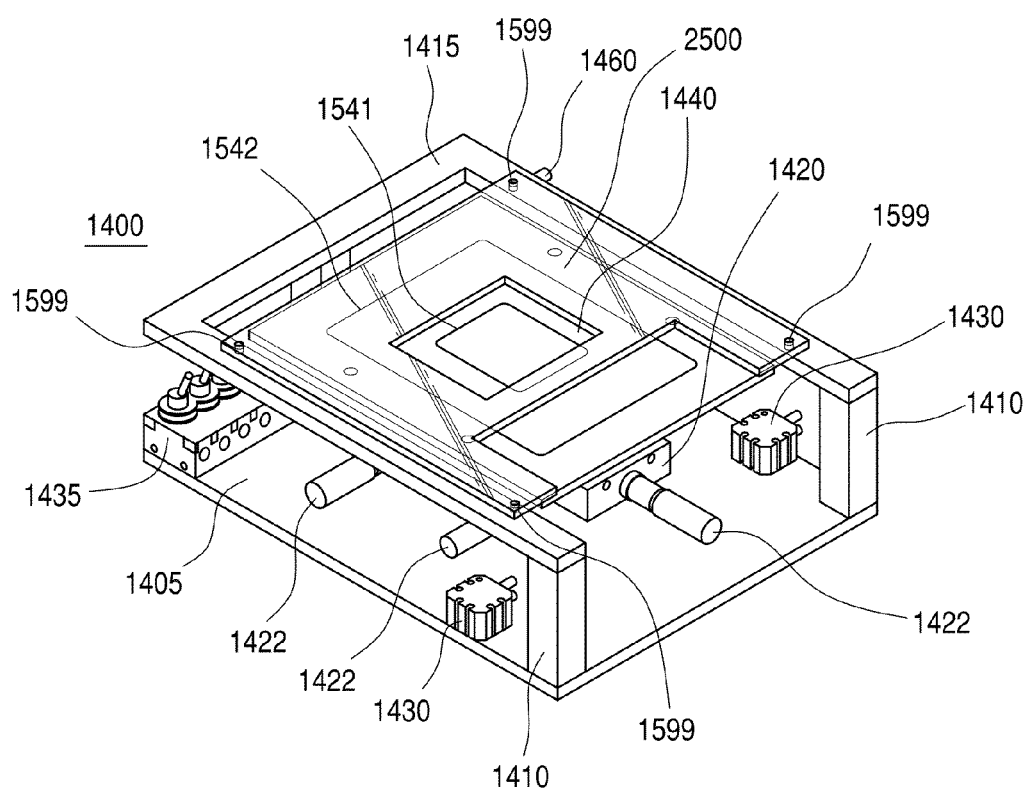
FIG. 25 illustrates a perspective view of a fourth example of a system for aligning a color filter array over a display, according to a fourth embodiment.

Referring now to FIG. 25, in some embodiments, system 1400 can have a holder 2500 (FIG. 25). In many embodiments, holder 2500 can be similar to support 2200 as described above. In some embodiments, holder 2500 can be configured to hold a color filter array (CFA). As an example, the color filter array can be the same as or similar to color filter array 460 (FIGS. 4 and 7) and/or color filter array 860 (FIG. 8). In addition, holder 2500 can be configured to hold other items that are to be aligned to an item held by chuck 1440. Holder 2500 can be held over chuck 1440 by platform 1415 such that holder 2500 does not contact chuck 1440 and such that a color filter array coupled to holder 2500 does not contact a display coupled to chuck 1440. In this manner, the position of chuck 1440 and the display can be moved with respect to holder 2500 and the color filter array so that the color filter array and the display can be aligned to each other. As an example, the offset gap between the color filter array and the display can be approximately 0.01 inches (0.25 millimeters) to approximately 0.05 inches (1.27 millimeters). In the example shown in FIG. 25, holder 2500 and the color filter array coupled to holder 2500 remain stationary during the alignment process, and chuck 1440 and the display coupled to chuck 1440 are moved relative to holder 2500 and the color filter array coupled to holder 2500. In different embodiments, the display can remain stationary while the position of the color filter array is adjusted, or the positions of both the display and the color filter array can be adjusted. In many embodiments, holder 2500 can comprise approximately the same length and width dimensions of holder 1445.

In some embodiments, after the color filter array has been coupled to holder 1445, holder 1445 can be removed from holder assembly 1700 and positioned over system 1400, as illustrated in FIG. 14. In the same or different embodiments, holder 1445 can be placed over platform 1415. Platform 1415 can include pins 1599 that are inserted into holes 1799 (FIG. 17) of holder 1445 and lock the four corners of holder 1445 in place over platform 1415. Holder 1445 will lock into place over platform 1415 so that holder 1445 is immobile in relation to platform 1415. To adjust the relationship of the display on chuck 1440 in relation to the color filter array coupled to holder 1445, a user can adjust the positioning of the display by using adjustment knobs 1422.

Figure 26:
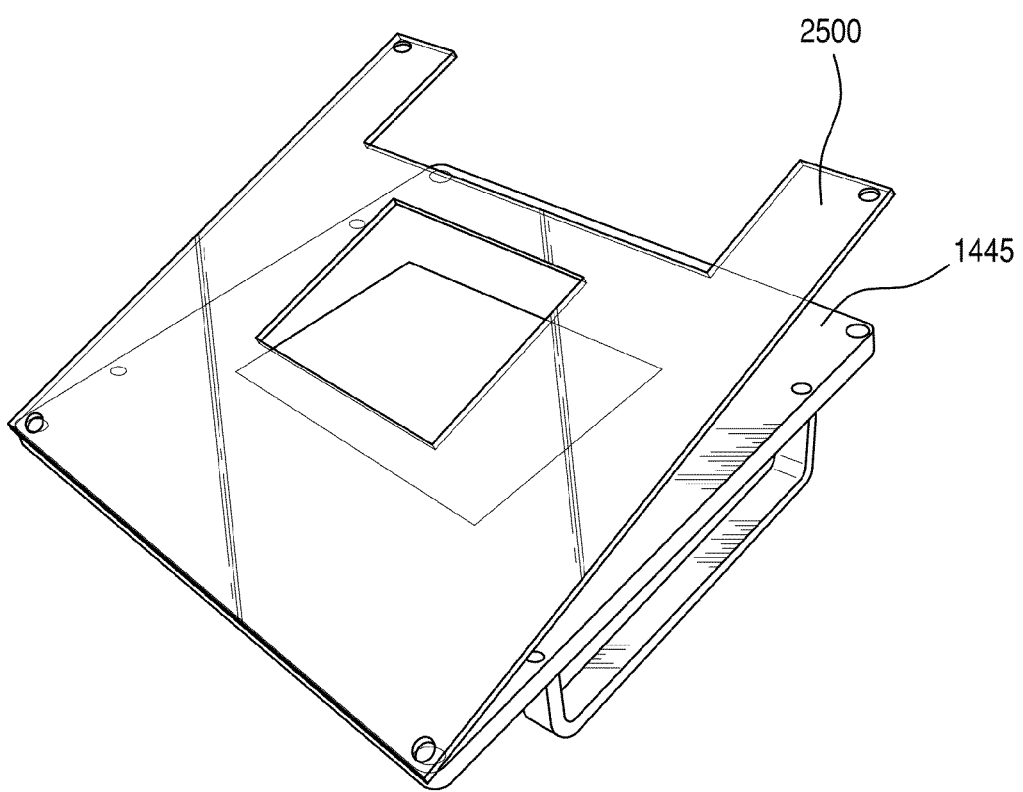
FIG. 26 illustrates a perspective view of a first holder of the system of FIG. 25 being lowered over a color filter array coupled to an inverted second holder of the system of FIG. 14 in order to couple the color filter array to the first holder.

In other embodiments, holder 1445 can be placed over holder assembly 1700 (FIG. 17) or another flat surface so that holder 1445 is placed in a direction that is opposite of the way holder 1445 is placed on system 1400 in various other embodiments. In some embodiments, the color filter array can then be placed over holder 1445 with an adhesive side of the color filter array facing away from holder 1445. In the same or different embodiments, the non-adhesive side of the color filter array can be coupled to holder 1445 using the vacuum line of holder 1445. In some embodiments, a first marker of holder 2500 can be aligned with a second marker of the color filter array and then the color filter array can be coupled to holder 2500. As illustrated in FIG. 26, in some embodiments, the color filter array can be coupled to holder 2500 by lowering holder 2500 on to the color filter array. In the same or different embodiments, the black, dark, or other border of the color filter array can be aligned with the opening in holder 2500.

In some embodiments, after the color filter array has been coupled to holder 2500, the color filter array can be decoupled from holder 1445. In further embodiments, holder 2500 can be removed from holder 1445 and positioned over system 1400, as illustrated in FIG. 25. In the same or different embodiments, holder 2500 can be placed over platform 1415. Platform 1415 can include pins 1599 (FIG. 15) that are inserted into holes 2299 (FIG. 22) of holder 2500 and lock the four corners of holder 2500 in place over platform 1415. Holder 2500 will lock into place over platform 1415 so that holder 2500 is immobile in relation to platform 1415. To adjust the relationship of the display on chuck 1440 in relation to the color filter array coupled to holder 2500, a user can adjust the positioning of the display by using adjustment knobs 1422.

System 1400 can also include mechanisms that allow system 1400 to be moved. For example, a user may need system 1400 to be moved so that it is positioned under an optical viewer. In one example, system 1400 comprises eight ball bearings on the bottom of base 1405 to evenly distribute the weight of system 1400 and assist in moving system 1400 across a support surface such as a table. Each of the ball bearings can comprise stainless steel and can have a 0.25 inch (6.35 millimeter) to 0.375 inch (9.53 millimeter) diameter.

In addition, system 1400 can also have air pushers 1430. Air pushers 1430 force rubber feet 1650 (as seen in FIG. 16) from being positioned within the same plane as base 1405 downward to be in contact with the surface in which system 1400 rests. When air pushers 1430 force rubber feet 1650 down, the rubber feet lift the ball bearings off of the table or support surface on which system 1400 rests. Thus, system 1400 becomes relatively immobile in relation to the surface on which it rests. The ball bearings, such as ball bearings 1649 (FIG. 16), can be located at the same location as rubber feet 1650, but are not visible in FIG. 16 because rubber feet 1650 are forced down in FIG. 16 to prevent ball bearings 1649 from contacting the support surface. In one example, each one of rubber feet 1650 can circumscribe a different one of the ball bearings.

Furthermore, system 1400 comprises switches 1435. Switches 1435 enable a user to control various aspects of system 1400. For example, one of switches 1435 can turn on air pushers 1430, thus using air pressure to force rubber feet 1650 down onto the support surface. In the same or other examples, various switches 1435 can be used to control the vacuum lines. For example, one of the switches can be used to turn on vacuum line 1541, another switch can be used to turn on vacuum line 1542, and another switch can be used to turn on the vacuum line on holder 1445, which couples the color filter array to holder 1445.

System 1400 also can include various aspects of system 800 (FIG. 8). For example, system 1400 can include an optical viewer. The optical viewer can be the same as or similar to optical viewer 890. In addition, system 1400 can include a coupling member. The coupling member can be the same as or similar to coupling member 992 (FIG. 9). Furthermore, system 1400 can include a control unit. The control unit can be the same as or similar to control unit 895 (FIG. 8).

Although the invention has been described with reference to specific embodiments, it will be understood by those skilled in the art that various changes can be made without departing from the spirit or scope of the invention. Accordingly, the disclosure of embodiments is intended to be illustrative of the scope of the invention and is not intended to be limiting. It is intended that the scope of the invention shall be limited only to the extent required by the appended claims. For example, to one of ordinary skill in the art, it will be readily apparent that processes 531, 532, 533, and 534 of FIG. 5, processes 2310, 2320, and 2330 of FIG. 23, and procedures 110, 120, 130, and 140 of FIG. 1 may be comprised of many different processes and procedures and be performed by many different modules, in many different orders, that any element of FIGS. 1, 3-5, 7-9, 14-19, 21-23, 25, and 26 may be modified, and that the foregoing discussion of certain of these embodiments does not necessarily represent a complete description of all possible embodiments.

Rather, the detailed description of the drawings, and the drawings themselves, disclose at least one preferred embodiment, and may disclose alternative embodiments. For example, the methods and systems described herein can be used in different applications such as positioning other types of thin films, positioning flexible laminates such as moisture barrier films or color filter arrays, or other applications for aligning or laminating films without trapping air bubbles. In some examples, the flexible laminate can be both a moisture barrier and a color filter array. Moisture barrier files used with displays are available from E-Ink Corp. in Cambridge, Mass. and 3M Corp. in St. Paul, Minn.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system for aligning a color filter array, the system comprising:
    a chuck configured to be coupled to a display;
    a holder configured to be coupled to a color filter array;
    an adjustment assembly configured to adjust the position of the chuck relative to the holder;
    a base;
    an air pusher; and
    one or more rubber feet;
    wherein:
        at least one of:
            the adjustment assembly is configured to be coupled to the chuck;
            the adjustment assembly is configured to be coupled to the base; or
            the base comprises a rolling mechanism;
        the air pusher is configured to force the one or more rubber feet out of the base;
        the rolling mechanism comprises ball bearings;

when the air pusher is turned off, the one or more rubber feet are located at least partially within the base such that the ball bearings are able to facilitate moving the system; and when the air pusher is turned on, the one or more rubber feet are forced out of the base by the air pusher such that the ball bearings are unable to facilitate moving the system.

2. The system of claim 1 further comprising:
a holder assembly configured to support the holder when the color filter array is being coupled to the holder, the holder being configured to be removed from the holder assembly before being positioned over the chuck.

3. The system of claim 1 further comprising:
at least one vacuum line.

4. The system of claim 3 wherein:
the at least one vacuum line comprises
at least one color filter array vacuum line configured to couple the color filter array to the holder.

5. The system of claim 3 wherein:
the at least one vacuum line comprises at least one display vacuum line configured to couple the display to the chuck.

6. A system for aligning objects, the system comprising:
a base;
a first holding mechanism configured to hold a first object of the objects;
a second holding mechanism configured to hold a second object of the objects;
an adjustment mechanism coupled to the base and the first holding mechanism;
an air pusher; and
one or more rubber feet;
wherein:
    the adjustment mechanism is configured to adjust a position of the first holding mechanism and the first object relative to the second holding mechanism and the second object;
    at least one of:
        the adjustment mechanism is configured to be coupled to the first holding mechanism;
        the adjustment mechanism is configured to be coupled to the base; or
        the base comprises a rolling mechanism;
    the air pusher is configured to force the one or more rubber feet out of the base;
    the rolling mechanism comprises ball bearings;
    when the air pusher is turned off, the one or more rubber feet are located at least partially within the base such that the ball bearings are able to facilitate moving the system; and
    when the air pusher is turned on, the one or more rubber feet are forced out of the base by the air pusher such that the ball bearings are unable to facilitate moving the system.

7. The system of claim 6 wherein
the first object is configured to be coupled to the first holding mechanism with at least one first object vacuum line.

8. The system of claim 6 wherein:
the second object is configured to be coupled to the second holding mechanism with at least one second object vacuum line.

9. The system of claim 6 further comprising:
a platform;
wherein:
    the platform is configured to be coupled to the base; and
    the platform is configured to be coupled to the second holding mechanism and to support the second holding mechanism over the first holding mechanism such that the second holding mechanism does not contact the first holding mechanism.

10. The system of claim 6 wherein:
the first object comprises a flexible laminate; and
the second object comprises a display.

11. The system of claim 9 wherein:
the second holding mechanism is configured to be immobilized relative to the base when the second holding mechanism is coupled to the platform; and
the first holding mechanism is configured to remain mobile relative to the base and the second holding mechanism when the second holding mechanism is coupled to the platform.

12. The system of claim 10 wherein:
the flexible laminate comprises at least one of a moisture barrier film or a color filter array.

\* \* \* \* \*